United States Patent [19]

Hamada et al.

[11] Patent Number: 4,546,857
[45] Date of Patent: Oct. 15, 1985

[54] CONVEYOR SYSTEM FOR A DRIVE-IN BANK

[75] Inventors: Takaaki Hamada, Kure; Yohji Kobayakawa, Hiroshima; Akira Nishikawa, Hiroshima; Manabu Kawahara, Hiroshima, all of Japan

[73] Assignee: Kumahira Safe Co., Inc., Hiroshima, Japan

[21] Appl. No.: 572,454

[22] Filed: Jan. 20, 1984

[30] Foreign Application Priority Data

Jul. 21, 1983 [JP] Japan .............................. 58-131982
Jul. 21, 1983 [JP] Japan .............................. 58-131983
Jul. 21, 1983 [JP] Japan .............................. 58-131984
Jul. 21, 1983 [JP] Japan .............................. 58-131985
Jul. 21, 1983 [JP] Japan .............................. 58-131986
Jul. 21, 1983 [JP] Japan .............................. 58-131987
Jul. 21, 1983 [JP] Japan .............................. 58-131988

[51] Int. Cl.$^4$ .................................................. E04H 3/04
[52] U.S. Cl. ........................................ 186/37; 186/14; 186/16; 104/165; 198/803.03
[58] Field of Search ................................ 186/14–18, 186/26, 27, 31, 32, 34, 36, 37, 53, 58, 60; 198/648, 750, 655; 109/10, 19; 104/107, 173 R, 189, 192, 108, 165, 180, 110; 414/662; 238/122, 243

[56] References Cited

U.S. PATENT DOCUMENTS

| 574,715 | 1/1897 | Cowley | 186/15 |
| 824,024 | 6/1906 | Johnson | 186/15 |
| 2,896,748 | 7/1959 | McClintock | 186/37 |
| 2,904,131 | 9/1959 | Bailey | 186/37 X |
| 4,010,824 | 3/1977 | Bavis | 186/37 |

Primary Examiner—Joseph J. Rolla
Assistant Examiner—Kevin P. Shaver
Attorney, Agent, or Firm—Cushman, Darby & Cushman

[57] ABSTRACT

An improved conveyor system for a so-called drive-in bank through which cash, deposit slip or the like are safely transferred from the customer station to the teller station and vise versa is disclosed. To assure that each of customers who reach the bank is visually recognized from the teller room a plurality of vertical hollow columns at the customer station are arranged one after another in a spaced relation in the direction of reaching of customers' cars and a plurality of vertical hollow columns at the teller station are centralized in a small area adjacent to the teller room. A plurality of horizontally extending hollow beams are fixedly mounted on the top end parts of the vertical hollow columns at both the customer and teller stations in such a manner that the former are turned by a predetermined angle relative to the latter as seen from the above. A cart comprising two pairs of upper and lower plates turnably connected to one another, two upper rollers and two lower rollers serves as a carrier means for conveying a deposit box from the customer station to the teller station and vise versa while the deposit box is carried on the cart. Inner and outer endless conveyance belts are extended through the hollow framework to drive the cart while they come in frictional contact with the deposit box. The cart moves on two rails which are extended through the hollow framework.

13 Claims, 26 Drawing Figures

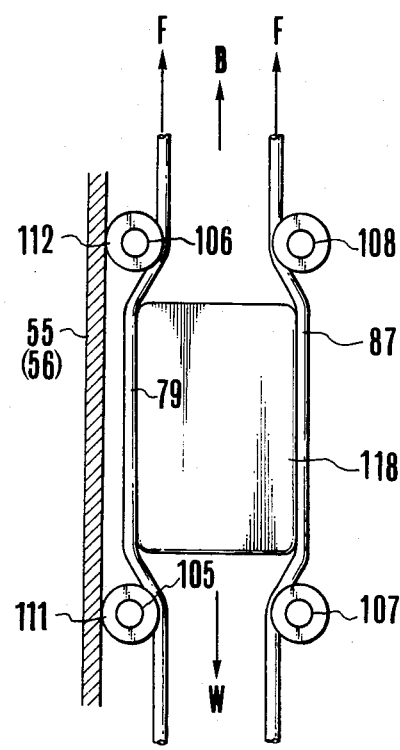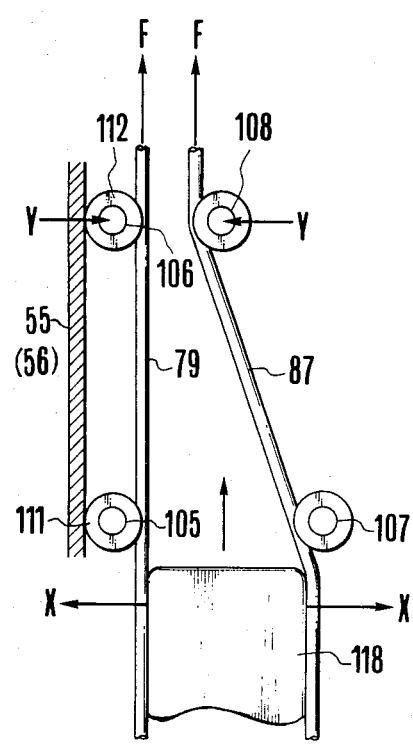

CONVEYOR SYSTEM FOR A DRIVE-IN BANK

BACKGROUND OF THE INVENTION

1. Field of the Invention

The present invention relates to a conveyor system for conveying cash, deposit slip, pass-book or the like in accordance with a so-called drive-up banking system.

2. Description of the Prior Art

Drive-in banking facilities by means of which bank customers may transact their business without any necessity for leaving their cars have become increasingly popular particularly in western countries in recent years. These banking facilities are typically constructed such that several lanes of car tracks are arranged so as to allow the same number of cars as that of the lanes to enter there and stop at the position located by an island at which customers transact their business such as depositing, drawing or the like simultaneously with the aid of individual conveyor line while they stay in their cars. The conventional banking facilities as described above are operated using pneumatic power or vacuum. One of them as disclosed in U.S. Pat. No. 4,135,684 is operated under the influence of vacuum but a problem is pointed out that the facility is installed and operated at an expensive cost due to necessity for assuring vacuum tightness throughout the whole length. Another one is disclosed in U.S. Pat. No. 4,101,824 which was invented for so-called drive-in banks with a plurality of endless belt conveyor lines being employed therefor.

To facilitate understanding of the present invention it will be helpful that the last-mentioned conventional banking facility will be briefly described below.

In FIG. 1 reference numeral 1 designates a window fitted to the building of a bank and reference numerals 2, 3 and 4 do a customer station respectively which is disposed on each of islands 5, 6 and 7 which are spaced from one another by a distance equal to the width of a car. The bank includes teller stations 8, 9 and 10 which are interconnected to the customer stations 2, 3 and 4 by way of vertical hollow columns 11, 12 and 13, horizontally extending hollow beams 17, 18 and 19 and another vertical hollow columns 14, 15 and 16. In each of the vertical hollow columns and the hollow beams a conveyance mechanism as illustrated in FIG. 2 is housed. Specifically, reference numeral 21 designates a deposit box operatively held between an opposing pair of endless conveyor belts 22 and 23 adapted to be driven in the same direction by means of a pair of motors 24 and 25 via endless belts 26 and 27 and pulleys 28 and 29. A plurality of idle rollers 30 and 31 rotatably disposed in the vertical section of the conveyance mechanism are arranged in a zigzag relation so as to allow them to come in rolling contact with the endless conveyor belts 22 and 23. It should be noted that distance between the adjacent idle rollers 30 and 31 is dimensioned a little longer than the length of the deposit box 21. Further, an endless conveyor belt 32 is extended through the horizontal section so as to form an arcuate end part in the proximity of the vertical section. As will be apparent from the drawing, the endless conveyor belt 32 is adapted to be driven by means of a motor 33 via an endless belt 34 and a pulley 35. A pair of conveyance mechanisms are provided at both the intersected positions defined by, for instance, the vertical hollow columns 11 and 14 and the horizontally extending hollow beam 17 so that a deposit box 21 is carried from the customer station 2 to the teller station 8 and vice versa.

During conveyance of the deposit box 21 through the vertical hollow columns 11 and 14 it is forced to perform snake motion under the influence of thrusting force given by the idle rollers 30 and 31 so that it is transferred from either of the vertical hollow columns 11 and 14 to the horizontally extending hollow beam 17.

However, the above-described endless belt conveyor type conventional banking facility has a problem that a number of driving motors and idle rollers are required and therefore the facility is installed and operated at an expensive cost. Further, another problem is that due to snake motion of the deposit box during conveyance it is displaced at a reduced conveyance speed and transference from the vertical hollow column to the horizontally extending hollow beam and vice versa fails to be smoothly effected sometimes, resulting in increased possibility of occurrence of malfunction.

The length of the horizontally extending hollow beams is determined in dependence on the distance between the teller station and the island and in practice they are cut to the predetermined length in a manufacturing factory prior to shipping therefrom. Thus it cannot be adjusted at the position in a bank where the facility is to be installed.

As the number of islands increase, the number of vertical hollow columns and horizontally extending hollow beams increases correspondingly. However, to assure that each of customers in cars at the customer stations is visually recognized from the teller room without fail there is necessity for enlarging a distance between the adjacent vertical hollow columns at the customer stations. Therefore, as the distance increases, it is naturally required that a distance between the adjacent vertical hollow columns at the teller stations is enlarged. This leads to an increased spaced required for the teller room and therefore bank personnels are hard to work in the teller room. Alternatively, when an arrangement is made such that the vertical hollow columns at the teller stations are got together around a table in the teller room while a distance between the adjacent vertical hollow columns at the customer stations is enlarged, there is necessity for causing each of the horizontally extending hollow beams to be inclined at a certain inclination angle from the transversal direction of the conveyor system as seen from the above. However, the conventional banking facility of the above-mentioned type has difficulty in smoothly transferring a deposit box from the vertical hollow column to the horizontally extending hollow beam and vice versa once the latter is arranged in the inclined state as seen from the above, resulting in frequent occurrence of incorrect operation and stoppage. Thus, the inclined type conventional banking facilities are not suitably employed for practical use.

SUMMARY OF THE INVENTION

The present invention has been made with the foregoing problem in mind and its object resides in providing an improved conveyor system for a drive-in bank of the type including customer stations, a plurality of vertical hollow columns at the customer stations, teller stations, a plurality of vertical hollow columns at the teller stations, a plurality of horizontally extending hollow beams for connecting the vertical hollow columns at both the customer and teller stations to one another at their top ends and conveyance means for conveying a deposit box through the hollow framework from the customer station to the teller station and vice versa, wherein the improvement consists in that a deposit box is more safely transferred from the customer station to the teller station and vice versa without any fear of causing a personnel in the teller room to fail to visually recognize each of customers who have reached the drive-in bank.

Other object of the invention is to provide an improved conveyor system for a drive-in bank of the above-mentioned type which can be installed and operated at an inexpensive cost.

Another object of the invention is to provide an improved conveyor system for a drive-in bank of the above-mentioned type which can be assembled in an installation site by a small number of workers.

Further another object of the invention is to provide an improved conveyor system for a drive-in bank of the above-mentioned type which assures that conveyance is smoothly carried out without occurrence of malfunction such as stoppage, intermittence of operation or the like particularly at arcuate bent portions on the conveyance passage.

To accomplish the above objects there is proposed in accordance with the present invention an improved conveyor system for a drive-in bank of the above-mentioned type characterized in that the conveyance means essentially comprises guide members having arcuate bent portion at junctions between the vertical hollow column at the customer station and the horizontally extending hollow beam as well as between the vertical hollow column at the teller station and the horizontally extending hollow beam, inner and outer endless conveyance belts extending along the guide members to resiliently hold a deposit box in the space as defined by said inner and outer endless conveyance belts, a cart adapted to removably contain the deposit box therein which comes in resilient contact with the inner and outer endless conveyance belts, said cart being movable on the guide members in both directions and stopper means disposed at both the end parts of the guide members so as to inhibit further movement of the cart.

A cart serving as a carrier means is preferably constituted by two pairs of upper and lower plates turnably connected to one another at the middle part thereof, two upper rollers rotatably supported on the upper plates at both the end parts of the latter, said upper rollers serving to connect the opposing pair of upper plates to one another, two lower rollers rotatably supported on the lower plates at both the end parts of the latter, said lower rollers serving to connect the opposing pair of lower plates to one another, and four wheels rotatably supported on the lower rollers at the position located outwardly of the lower plates, said wheels being adapted to roll on the guide members in the form of a rail.

In a preferred embodiment of the invention the one end part of the horizontally extending hollow beam is formed with an arcuate groove and the top end part of the one vertical hollow column includes an engagement means adapted to be fitted through the arcuate groove, while the other end part of the horizontally extending hollow beam is formed with an arcuate groove and the top end part of the other vertical hollow column includes an engagement means adapted to be fitted through the arcuate groove, so that the horizontally extending hollow beam is fixedly mounted on the top end parts of both the vertical hollow columns in the turned state relative to the latter as seen from the above.

The guide members comprises two lines of rails extending in parallel to one another and the rails includes arcuate bent portion at a junction between the vertical hollow column at the customer station and the horizontally extending hollow beam as well as between the vertical hollow column at the teller station and the horizontally extending hollow beam. At the arcuate bent portions the rails are twisted at a certain angle which is determined in dependence on the position where the vertical hollow column is disposed at the customer station.

The driving means for circulating the inner and outer endless conveyance belt through the hollow framework is preferably constituted by a motor fixedly mounted on the vertical hollow column at the customer station, a speed reduction mechanism operatively connected to said motor, two pulleys fixedly mounted on the output shaft of the speed reduction mechanism, a pair of shafts rotatably supported on the vertical hollow column in a spaced relation, a driven pulley fixedly mounted on one of said shafts with an endless belt extended between one of said two pulleys and said driven pulley in a parallel relation, a driving pulley fixedly mounted at the aforesaid one shaft around which one of the endless conveyance belts is extended, another driven pulley fixedly mounted on the other shaft with an endless belt extended between the other pulley and the driven pulley in a cross-shaped relation and another driving pulley fixedly mounted on the aforesaid other shaft around which the other endless conveyance belt is extended.

Other objects, features and advantages of the invention will become more clearly apparent from reading of the following specification which has been prepared in connection with the accompanying drawings.

BRIEF DESCRIPTION OF THE DRAWINGS

The accompanying drawings will be briefly described below.

FIGS. 25 and 26 are a sectional side view schematically illustrating how a deposit box is housed in a cart.

DETAILED DESCRIPTION OF THE PREFERRED EMBODIMENT

Now, the present invention will be described in a greater detail hereunder with reference to the accompanying drawings.

Figure 1:
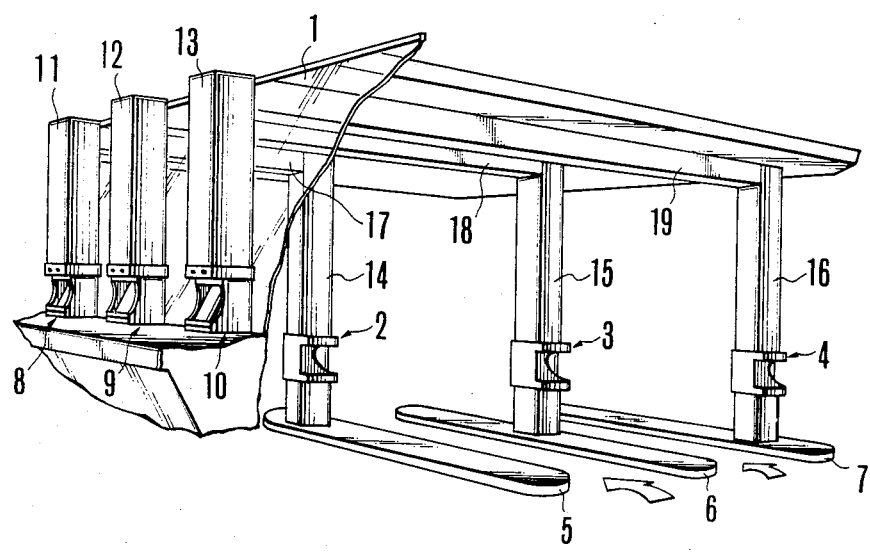
FIG. 1 is a perspective view of a conventional conveyor system for a drive-in bank.
Figure 2:
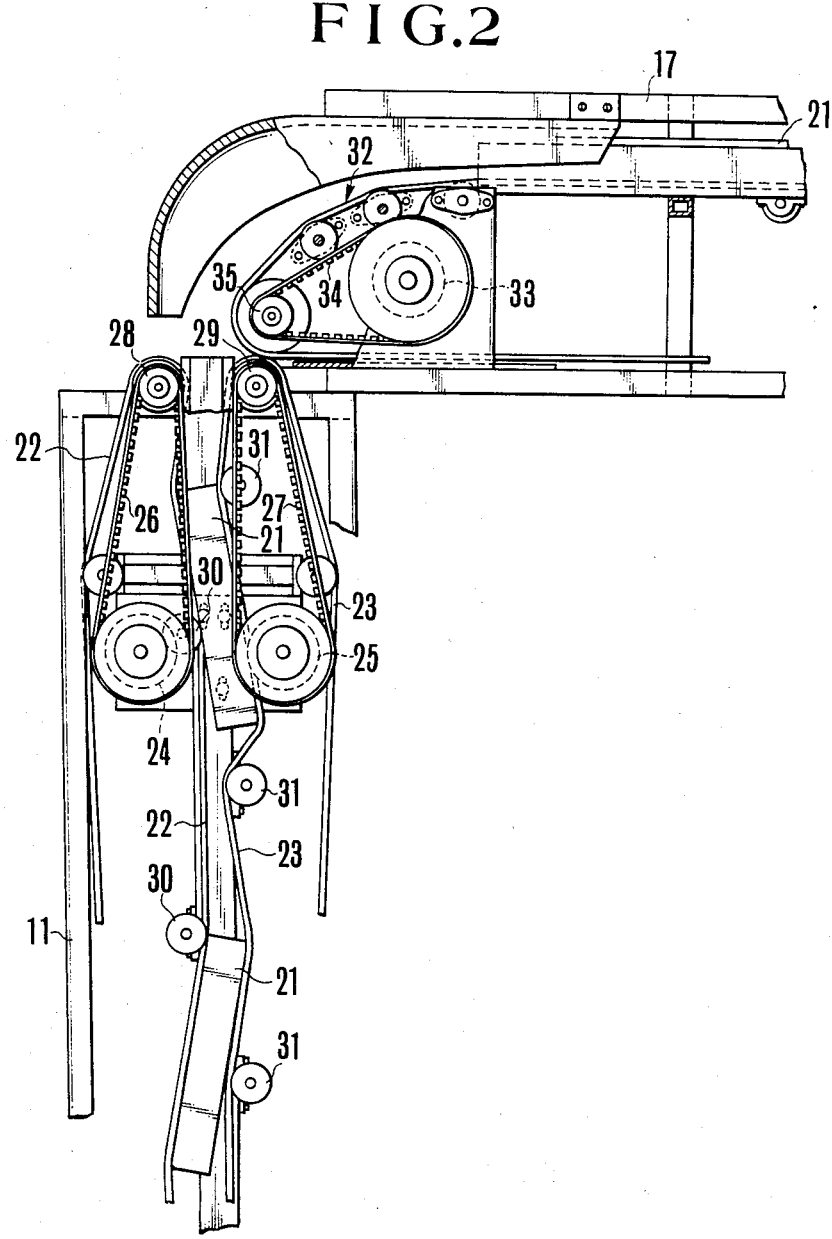
FIG. 2 is a partially sectioned side view of an essential part constituting the conventional conveyor system in FIG. 1.
Figure 3:
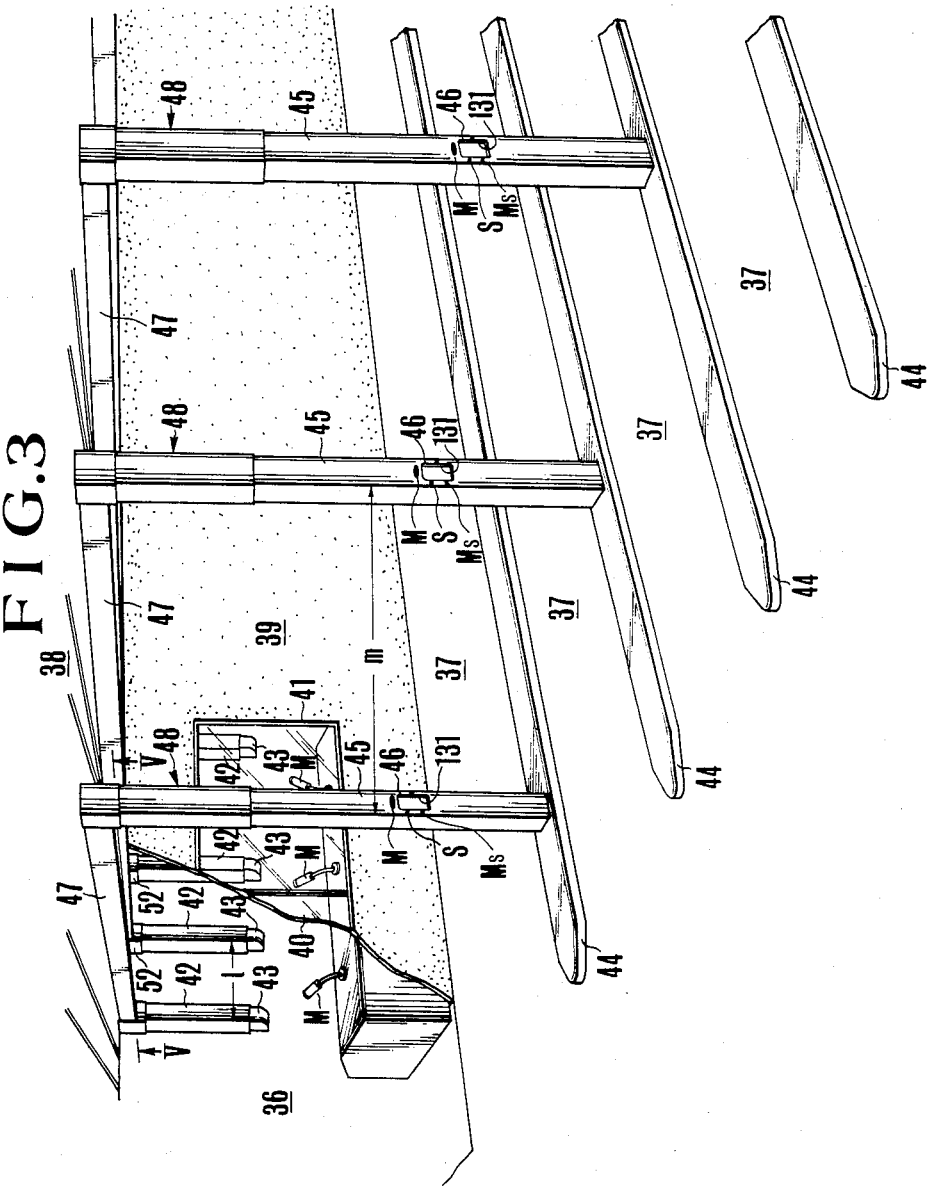
FIG. 3 is a perspective view of a conveyor system in accordance with the present inventinon.

In FIG. 3 reference numeral 36 designates a building in which a bank transacts its business. The building 36 has an eaves 38 which horizontally extends above a plurality of car lanes 37. Further, the building 36 has a wall 39 on which a window 41 is opened, said window 41 being fitted with a bulletproof glass 40. As is apparent from the drawings, a plurality of vertical hollow columns 42 hang from the ceiling along the wall of the building inwardly of the window 41 and each of the vertical hollow columns 42 is constructed in the form of an elongated box-shaped structure of which lower end portion constitutes a teller station. The car lanes 37 include a plurality of islands 44 located in parallel to one another in an equally spaced relation so that a single car lane is constituted between the adjacent islands 44. Between the islands 44 and the eaves 38 are vertically extended a plurality of vertical hollow columns 45 each of which is constructed in the form of an elongated box-shaped structure of which lower end portion constitutes a customer station. A horizontally extending hollow beam 47 fixedly secured to the eaves is bridged between each of pairs of the vertical hollow columns 42 and the vertical hollow columns 45. As is apparent from FIG. 1, an interphone switch MS and a microphone M serving also as a speaker are mounted on the customer station 45 at the position located in the proximity of a delivering and receiving opening 46 formed thereon, whereas a similar combination of switch and microphone is also provided on the teller station at the position in the proximity of a delivering and receiving opening 43. The vertical hollow columns 42 and 45 are designed in the same structure with the exception that they have a different length. For the sake of convenience for allowing any customer to transact his business while he stays in his car the delivering and receiving opening 46 at the customer station assumes a position lower than the delivering and receiving opening 43 at the teller station and therefore each of the vertical hollow columns 42 at the teller station has a length shorter than that of the vertical hollow columns 45 at the customer station. As is apparent from FIG. 2, a distance between the window 41 and the customer station on each of the islands 44 varies at a constant rate and therefore the length of each of the horizontally extending hollow beams 47 changes at the same rate. A combination of the vertical hollow column 42, the horizontally extending hollow beam 47 and the vertical hollow column 45 constitutes a continuous hollow framework as a whole.

Figure 4:
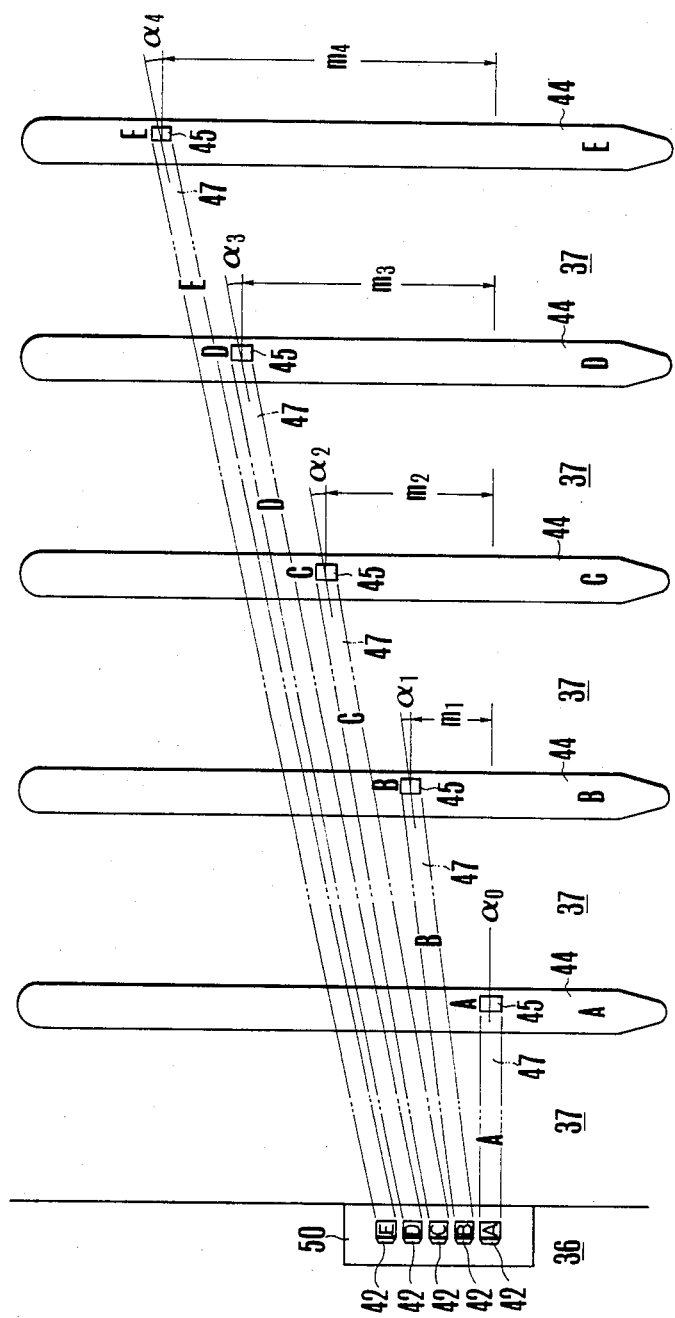
FIG. 4 is a plan view schematically illustrating the arrangement of the conveyor system in FIG. 3.

As illustrated in FIG. 4, five vertical hollow columns 42A to 42E hang from the ceiling in the area as defined by an operating desk 50 in the teller room and five horizontally extending hollow beams 47A to 47E extend in the rightward direction as seen in the drawing from the uppermost end of the vertical hollow columns 42A to 42E. Further, five islands 44A to 44E are arranged between the adjacent car lanes 37 and five vertical hollow columns 45A to 45E standing upright on the islands 44 are connected to the horizontally extending hollow beams 47A to 47E at their uppermost end parts. To assure that any customer who has reached one of the islands 44 can be visually identified from the interior of the teller room without a fear of causing such overlapping that one customer is located behind other customer an arrangement is made such that the second vertical hollow column 45B is located downstream of the first vertical hollow column 45A by a distance $m_1$, the third vertical hollow column 45 C is located downstream of the first vertical hollow column 45A by a distance $m_2$, the fourth vertical hollow column 45D is located downstream of the first vertical hollow column 45A by a distance $m_3$ and the fifth vertical hollow column 45E is located downstream of the first vertical hollow column 45A by a distance $m_4$. In the illustrated embodiment the second to fifth vertical hollow columns are increasingly dislocated from the first vertical hollow column but the present invention should not be limited only to this and they may be increasingly dislocated upstream of the first vertical hollow column at the distance rate as described above.

A turning angle of the vertical hollow columns 42 at the teller station relative to the operating desk 50 as seen from the above is specifically predetermined, whereas a turning angle of the vertical hollow columns 45 at the customer station relative to the islands 44 as seen from the above is also specifically predetermined. For instance, when the vertical hollow column 42B at the teller station is turned by 21 degrees relative to the lefthand end part of the horizontally extending hollow beam 47B, the vertical hollow column 45B at the customer station on the island 47B is naturally turned by the same angle of 21 degrees relative to the righthand end part of the horizontally extending hollow beam 47B. Further, when the vertical hollow column 42E at the teller station is turned by 24 degrees relative to the lefthand end part of the horizontally extending hollow beam 47E in the same manner as in the foregoing, the vertical hollow column 45E at the customer station on the island 47E is naturally turned by the same angle of 24 degrees relative to the righthand end part of the horizontally extending hollow beam 47E. It is natural that a turning angle of 24 degrees of the horizontally extending hollow beam 47E relative to the vertical hollow column 45E located downstream of the vertical hollow column 45A by a distance $m_4$ as well as a turning angle of 24 degrees of the vertical hollow column 42E relative to the horizontally extending hollow beam 47E is larger than a turning angle of 21 degrees of the horizontally extending hollow beam 47B relative to the vertical hollow column 45B as well as a turning angle of 21 degrees of the vertical hollow column 42B relative to the horizontally extending hollow beam 47B.

Figure 5:
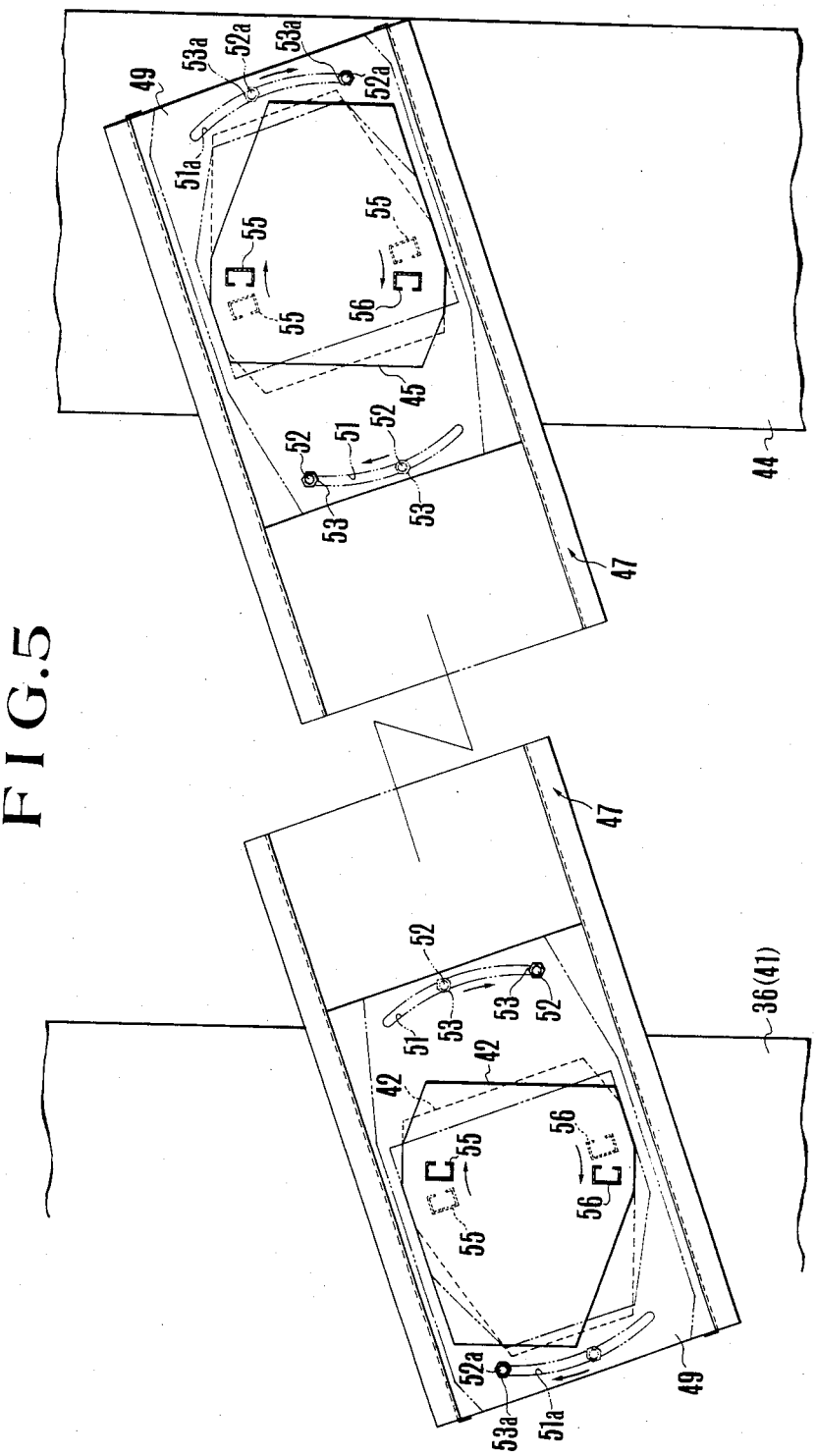
FIG. 5 is a cross-sectional view of the conveyor system as seen in the direction identified with arrow marks V in FIG. 3, shown in an enlarged scale.

As illustrated in more details in FIG. 5, the horizontally extending hollow beam 47 is formed with an opposing pair of arcuate grooves 51 and 51$_a$ at its both end parts through which bolts 52 and 52$_a$ are fitted. It should be noted that a member as identified by dotted lines in the drawing represents a vertical hollow column 52 in the case where no turning or twisting is effected with the latter. By tightening the bolts 52 and 52$a$ by means of nuts 53 and 53$_a$ the vertical hollow column 52 is fixedly connected to the horizontally extending hollow beam 47 at the outermost end part of the latter at the teller station in the turned posture relative to the former whereby a junction 49 is constituted. On the other hand, the vertical hollow column 45 is fixedly connected to the horizontally extending beam 47 at the other outermost end part of the latter at the customer station on the island 44 in the turned posture relative to the former by tightening the bolts 52 and 52$_a$ by means of 53 and 53$_a$ in the same manner as described above, whereby another junction 49 is constituted. Alternatively, an arrangement may be made such that the upper end part of the vertical hollow columns 42 and 46 is formed with an opposing pair of arcuate grooves similar to the aforesaid grooves 51 and 51$_a$ and the vertical hollow columns 42 and 46 and the horizontally extending hollow beam 47 are fixedly connected to one another by using bolts and nuts.

Next, as illustrated in FIGS. 6, 7, 8 and 12, two lines of rails 55 and 56 are extended in parallel to one another through the hollow framework 48 from the position located in the proximity of the delivering and receiving opening 43 at the teller station to the position in the proximity of the delivering and receiving opening 46 at the customer station. To allow the rails 55 and 56 to pass through both the junctions 49 each of them has an arcuate bent portion 57 which is convexly bent by a predetermined curvature. The rails 55 and 56 are firmly mounted on the framework 48 using a number of support members 58 and a plurality of connecting rods 59 are extended between both the rails 55 and 56 so as to assure that they are spaced at a predetermined distance. Specifically, the connecting rods 59 are disposed at both the end parts and the arcuate bent portions 57 of the rails 55 and 56 and idle rollers 60 and 61 are rotatably mounted on the connecting rod 59 at the arcuate bent portions 57.

Figure 8:
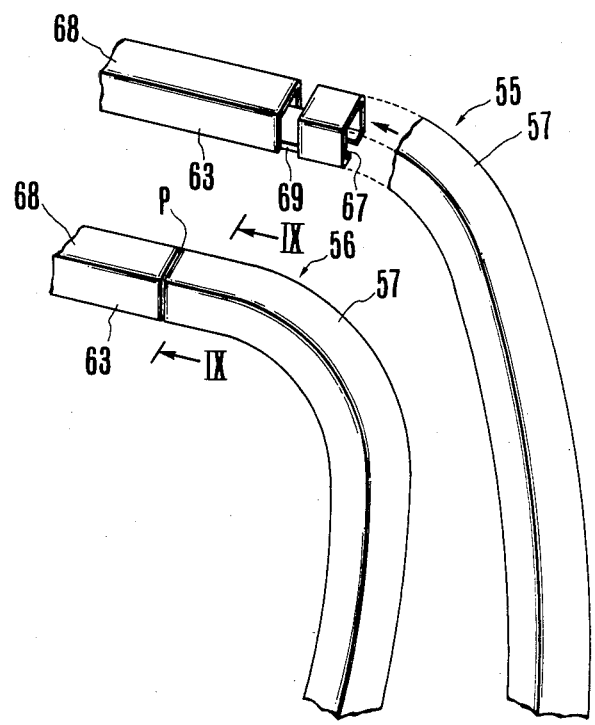
FIG. 8 is a perspective view of two lines of rails extending through the conveyor system.
Figure 9:
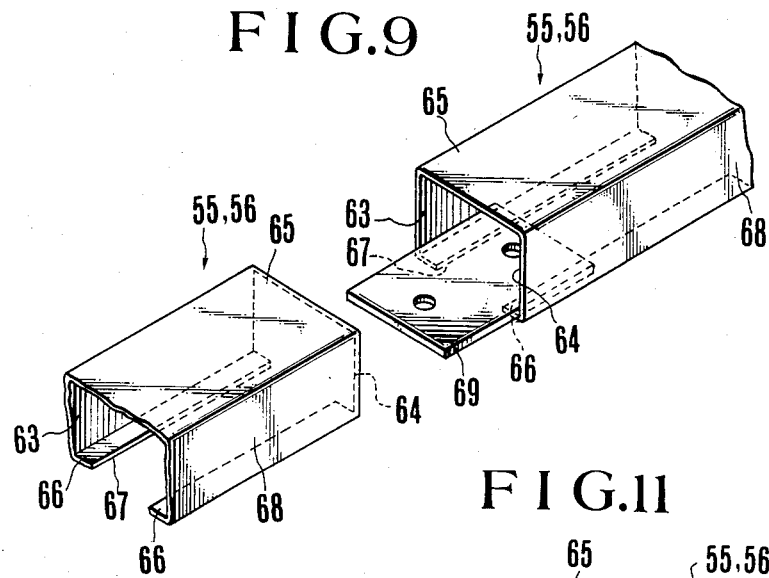
FIG. 9 is a perspective view illustrating a part of the rail in the exploded state.
Figure 11:
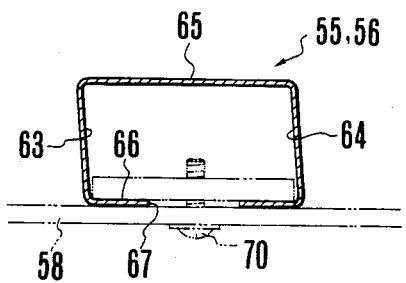
FIG. 11 is a cross-sectional view of the rail illustrating how it is twisted in the leftward direction as seen in the drawing.
Figure 10:
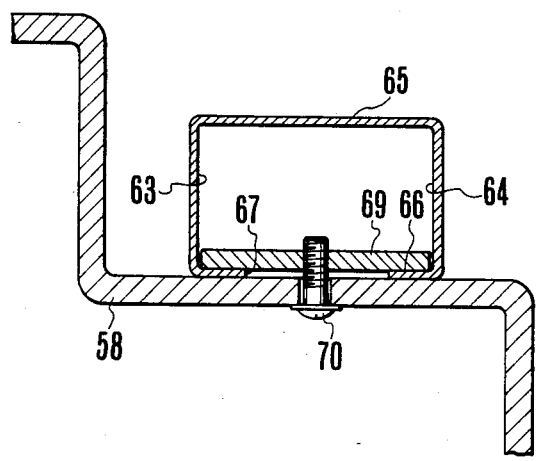
FIG. 10 is a cross-sectional view of the rail fixedly mounted on a support member.

As will be apparent from FIGS. 8 to 11, the rails 55 and 56 include an opposing pair of side walls 63 and 64, an upper face 65 and an opposing pair of lower faces 66 and a longitudinally extending cutout 67 is formed between said lower faces 66 throughout the full length of the rails 55 and 56. As illustrated in FIGS. 8 and 11, the rails 55 and 56 are subjected to twisting within an extent of 30 degrees at the arcuate bent portion 57 and thereby the cross-sectional configuration of the rails 55 and 56 is deformed a little bit wherein deformation will be accomplished without any particular difficulty owing to the provision of the aforesaid longitudinally extending cutout 67.

As illustrated in FIG. 8, each of the rails 55 and 56 comprises an arcuate bent portion 57 and a linearly extending portion 68 and the latter is constituted by a plurality of segments of which length is adequately determined as required. This is intended to make it possible to adjust the length of the rails 55 and 56 in dependence on a distance measured from the teller station to a specific customer station on one of the islands 44. In the drawings reference numeral 69 designates a connecting member by means of which the pair of lower faces 66 are connected to one another. As is apparent particularly from FIG. 9, the connecting member 69 is inserted into the interior of each of the rails 55 and 56 and has two threaded holes formed at the central part thereof. The rail 55 (56) at the arcuate bent portion 57 and the rail 55 (56) at the linearly extending portion 68 are connected to one another with their opposite end parts brought in abutment while the connecting member 69 is inserted through them and they are firmly mounted on the support member 58 with the aid of a plurality of bolts 70 which are fitted through both the connecting member 69 and the support member 58. The adjacent rails 55 (56) at the linearly extending portion 68 are connected to one another and firmly mounted on the support member 69 in the same manner as described above. Specifically, by tightening the bolts 70 which have been screwed through the threaded holes on the connecting member 69 the lower faces 66 of the rails 55 and 56 are firmly held on the support member 58 while they are connected to one another in the longitudinal direction without any gap formed therebetween.

Figure 6:
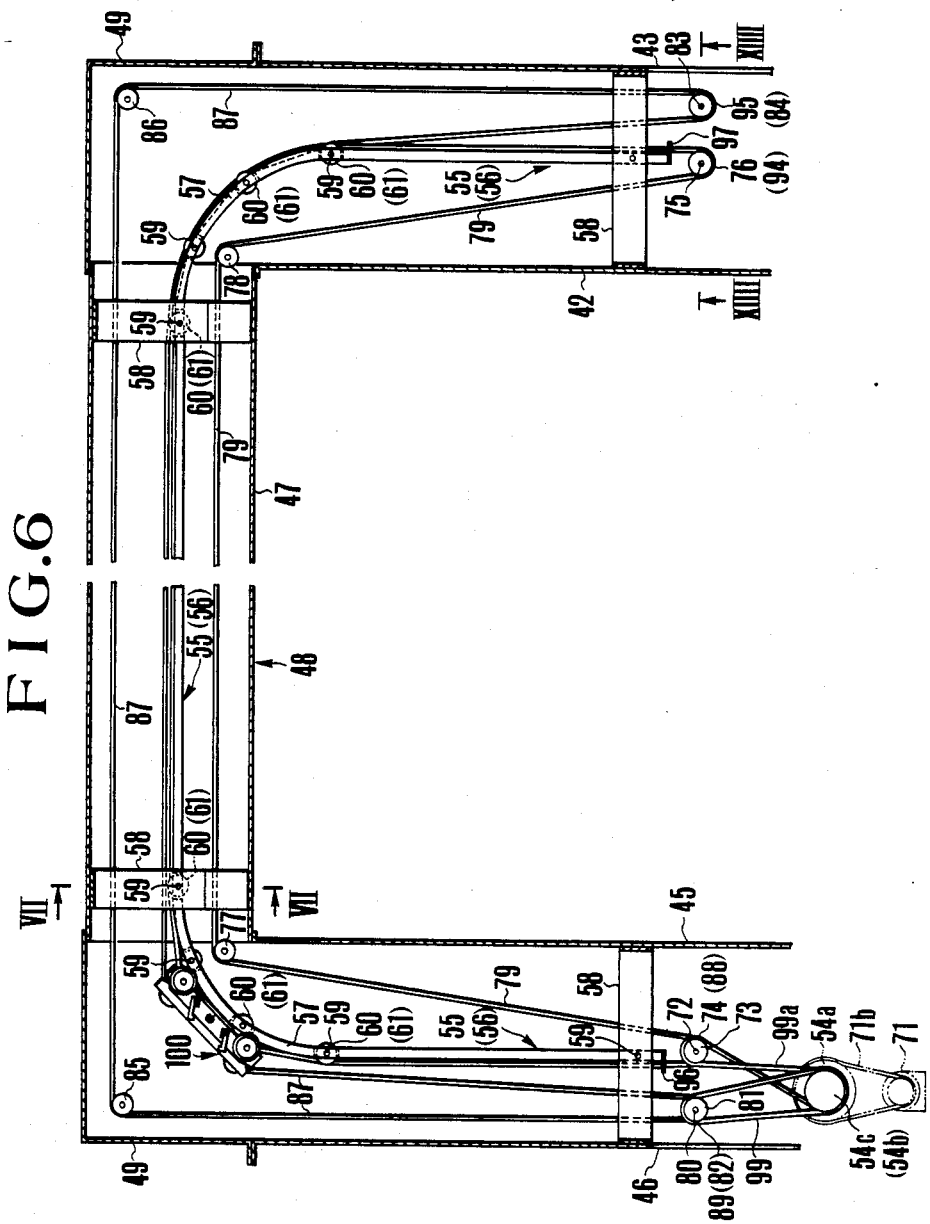
FIG. 6 is a vertical sectional side view of an essential part constituting the conveyor system in FIG. 3.
Figure 12:
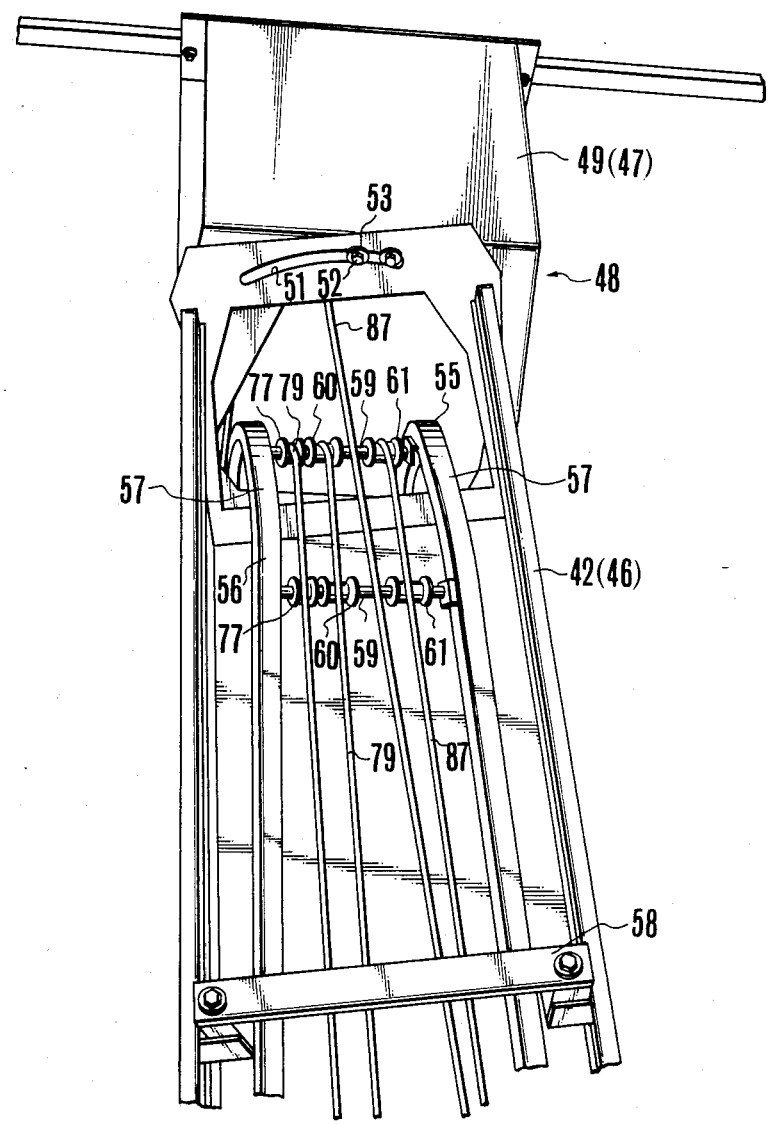
FIG. 12 is a perspective view of a bent portion on the conveyor system through which the rails are extended while they are twisted.

As illustrated in FIG. 12, the vertical hollow column 42 (45) stands upright in the turned or twisted state relative to the horizontally extending hollow beam 47 and therefore the rails 55 and 56 extending through the hollow framework 48 constituted by a combination of the vertical hollow columns 42 and 45 and the horizontally extending hollow beams 47 are twisted at the arcuate bent portion 57 in conformance with the aforesaid twisted state of the vertical hollow column 42 (45). Stress caused by twisting of the rails 55 and 56 at the customer station is absorbed between the righthand junction 49 and the island 44, whereas stress caused by twisting of the rails 55 and 56 at the teller station is absorbed only at the lefthand junction 49 as seen in FIG. 6. In the illustrated embodiment the rails 55 and 56 have a rectangular cross-section configuration but the present invention should not be limited only to this. Alternatively, they may have a circular cross-sectional configuration or they may be designed in the form of a pipe.

To facilitate assembly of the conveyor system of the invention the vertical hollow columns 42 at the teller station and the vertical hollow column 45 at the customer station are designed in the same dimensions. Each of the horizontally extending hollow beams 47 has a different length which varies in dependence on the position where the customer station is disposed on the island 44. Normally, prefabricated horizontally extending hollow beams having a standard length are delivered from a manufacturing plant to the building where a drive-in bank is to transact its business and they are cut to a certain size which is determined in accordance with a distance between the window 41 on the teller room and each of the islands 44 so that they are assembled on the vertical hollow columns 42 and 55 at both the teller and customer stations. On the other hand, the rails 55 and 56 are prepared to their required length by adding or cutting operation. When another length of rail is additionally fitted to them, the one rail 55 is connected to the other rail 55 at their jointed position by means of the connecting member 69 and the connected rails 55 are then fixedly mounted on the support member 58, whereas the one rail 56 is connected to the other rail 56 at their jointed position by means of the connecting member 69 and the connected rails 56 are then fixedly mounted on the support member in the same manner as described above. Thus, the rails 55 and 56 are extended through the hollow structure with their length being elongated or reduced to the predetermined one. The support members 58 are fixedly secured to the hollow framework 48 and the horizontally extending hollow beams 47 are suspended from the eaves 38.

Referring to FIGS. 4 and 5 again, to assure that each of customers who have arrived at the drive-in bank is visually recognized from the teller room each of the vertical hollow columns 45 is first mounted upright by the side of the car lane 37 in such a manner that their side wall extends in parallel to the island 44. Next, the horizontally extending hollow beams 47 are mounted on the top of the vertical hollow columns 45 at the customer station by means of the bolts $52_a$ adapted to slide along the arcuated groove $51_a$ while they are turned relative to the vertical hollow columns 45 by a required angle which is determined within the maximum turning angle of 30 degrees. As illustrated in FIG. 12, the junction 49 and the vertical hollow column 45 are fixedly connected to one another in the illustrated turned or twisted state by means of a combination of bolts and nuts $52_a$ and $53_a$. During twisting operation of the horizontally extending hollow beam 47 the rails 55 and 56 are twisted in the direction as identified with an arrow mark in FIG. 5 and geometrical deformation caused by twisting of the rails 55 and 56 are compensated by deformation of the side walls 63 and 64, the upper face 65, the lower face 66 and the longitudinally extending cutout 67 as illustrated in FIGS. 8 and 11. As a result stress developed due to twisting of them can be minimized. On the other hand, the horizontally extending hollow beams 47 are fixely mounted on the top of the vertical hollow columns 42 at the teller station in the turned state relative to the latter while the rails 55 and 56 are twisted in the same manner as described above. As is apparent from FIG. 11, the rails 55 and 56 are deformed in the parallelogram-shaped cross-sectional configuration and moreover the existence of the jointed portions P makes it easier to twist the rails 55 and 56.

Next, referring to FIGS. 6 and 13, the vertical hollow column 45 at the customer station includes a shaft 72 rotatably supported thereon, said shaft 72 being located below the lowermost end part of the rails 55 and 56. The shaft 72 has a driven pulley 73 and a driving pulley 74 fixedly mounted thereon, said driven pulley 73 and said driving pulley 74 being disposed on the shaft 72 in a spaced relation. The driving pulley 74 is located substantially in vertical alignment with the idle rollers 60 on the lefthand arcuate bent portion 57 as seen in FIG. 6 and the shaft 72 extends substantially in parallel to the connecting rods 59. Further, referring to FIG. 14, the vertical hollow column 42 at the teller station includes a shaft 75 rotatably mounted thereon, said shaft 75 being located below the lowermost end part of the rails 55 and 56. The shaft 75 has a driving pulley 76 fixedly mounted thereon. The driving pulley 76 is located substantially in vertical alignment with the idlers 60 on the righthand arcuate bent portion 57 and the shaft 75 extends substantially in parallel to the connecting rods 59.

Figure 7:
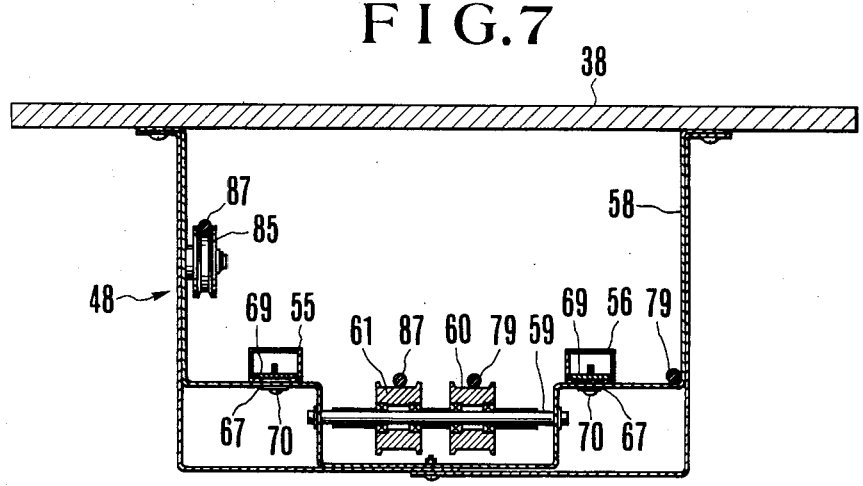
FIG. 7 is a cross-sectional view of the conveyor system taken in line VII—VII in FIG. 6.

Further, guide rollers 77 and 78 are rotatably disposed at the position located at the lower part of both the arcuate bent portions 57 in the interior of the hollow framework 48, wherein the axis of said guide rollers 77 and 78 extends substantially in parallel to the shafts 72 and 75. An endless conveyance belt 79 is extended around the driving pulley 74 at the customer station, the righthand idle rollers 60, the lefthand idle rollers 60, the driving pulley 76 at the teller station and the guide rollers 77 and 78 under the influence of tension imparted thereto, as illustrated in FIG. 6. Referring to FIG. 13 again, the vertical hollow column 45 includes another shaft 80 rotatably mounted thereof, said shaft 80 being spaced from the shaft 72 by a predetermined distance and extending in parallel to the latter. The shaft 80 has a driven pulley 81 and a driving pulley 82 fixedly mounted thereon, said driven pulley 81 and said driving pulley 82 being disposed on the shaft 80 in a spaced relation. The driving pulley 80 is located substantially in vertical alignment with the one idle rollers 61. As illustrated in FIG. 14, a shaft 83 is disposed at the position located by a predetermined distance outwardly of the shaft 57 at the teller station and a driving pulley 84 is fixedly mounted on said shaft 83 substnatially in vertical alignment with the other idle rollers 61. Further, guide rollers 85 and 86 are rotatably disposed at the position located above the arcuate bent portions 57 inwardly of the framework 48 (see FIG. 6). The rotational shafts of the guide rollers 85 and 86 extend in parallel to the shafts 80 and 83, whereas the shaft 75 does in parallel to the shaft 83. Another endless conveyance belt 87 is extended around the driving pulley 82 at the customer station, the guide rollers 85 and 86 located outwardly of the arcuate bent portions 57 and the idle rollers 61 disposed on both the arcuate bent portions 57 under the influence of tension imparted thereto, as illustrated in FIG. 6. Further, as illustrated in FIG. 7, both the idle rollers 60 and 61 are rotatably mounted on the same shaft 59 in a spaced relation so that the inner endless conveyance belt 79 is located away from the outer endless conveyance belt 87. In the illustrated embodiment a single line of inner endless conveyance belt and a single line of outer endless conveyance belt are extended through the hollow framework 48 but the present invention should not be limited only to this. For instance, two lines of inner endless conveyance belts and two lines of endless conveyance belts may be provided while another driving and driven pulleys are additionally mounted on the relevant shafts.

Referring to FIGS. 13 and 14 again, a distance between both the shafts 75 and 83 at the teller station is determined substantially same to that between the shafts 72 and 80 at the customer station. The endless conveyance belts 79 and 87 has a predetermined module of elasticity respectively so that they expand and contract as required. It should be noted that an extent of expansion and contraction of the outer endless conveyance belt 87 is determined larger than that of the inner endless conveyance belt 79. In FIG. 13 reference numerals 88 and 89 designate an auxiliary pulley fixedly mounted on the shafts 72 and 80 at the customer station respectively, said auxiliary pulleys 88 and 89 being fitted with rings 90 and 91 made of resilient material. On the other hand, auxiliary pulleys 94 and 95 are fixedly mounted on the shafts 75 and 83 at the teller station, wherein they are fitted with rings 92 and 93 made of resilient material in the same manner as described above. Referring to FIG. 6 again, stoppers 96 and 97 are provided at both the end parts of the rails 55 and 56. Incidentally, the guide rollers 77 and 78 disposed for the inner endless conveyance belt 79 may be located in the coaxial relation with respect to the connecting rod 59. In this case it is necessary that the guide rollers 77 and 78 are dislocated away from the idle rollers 60 and 61 in the axial direction on the connecting rod 59 (see FIG. 12).

Next, description will be made below as to a driving mechanism 98 with reference to FIG. 13. In the drawing reference numeral 54 designates a pulley shaft on which a pulley $54_a$ having a larger diameter and speed reduction pulleys $54_b$ and $54_c$ are fixedly mounted, said pulley shaft 54 being located below the shafts 72 and 80 and rotatably supported on the inner walls of the vertical hollow column 45 at the customer station. Further, a reversible motor 71 is stationarily disposed below the pulley shaft 54 at the position in the proximity of the lowermost end part of the vertical hollow column 45 and it includes an output shaft to which an output pulley $71_a$ is fixedly secured. Radius of the larger pulley $54_a$ is determined substantially larger than that of the speed reduction pulleys $54_b$ and $54_c$. An endless belt $71_b$ is extended around both the larger pulley $54_a$ and the output pulley $71_a$ under the influence of tension imparted thereto and thus a speed reduction mechanism is constituted by a combination of the output pulley $71_a$, the endless belt $71_b$, the larger pulley $71_a$, the speed reduction pulleys $54_a$ and $54_c$ and the pulley shaft 54, wherein the pulley shaft 54 serves as an output shaft for the speed reduction mechanism. An endless belt 99 is extended between the speed reduction pulley $54_b$ and the driven pulley 81 in the normal manner, whereas another endless belt $99_a$ is extended between the speed reduction pulley $54_c$ and the driven pulley 73 in the cross-shaped manner. The motor 71 is electrically connected to power supply source by way of a send switch S and a microswitch to be described later which are disposed in the proximity of each of the delivering and receiving openings 43 and 46, said microswitch being operated to stop rotation of the motor, and moreover an interphone M is mounted on the wall surface of the vertical hollow columns 42 and 45 at the position located above the delivering and receiving openings 43 and 46 (See FIG. 3).

Next, referring to FIGS. 6, 13 and 15 to 18, reference numeral 100 designates a cart adapted to move on the rails 55 and 56 in both the directions. The cart 100 includes a pair of lower plates 101 and 102 and a pair upper plates 103 and 104. The lower plates 101 and 102 have lower rollers 105 and 106 rotatably supported at their opposite end parts, said lower rollers 105 and 106 having a predetermined length, so that they are connected to one another. On the other hand, the upper plates 103 and 104 have upper rollers 107 and 108 rotatably supported at their opposite end parts, said upper rollers 107 and 108 having the same diameter and length, so that they are connected to one another.

The lower plate 101 and the upper plate 103 have a raised portion formed at their middle part in the opposite direction in such a manner that the raised portion of the lower plate 101 is overlapped on that of the upper plate 103 and both the raised portions are jointed turnably by means of a pin 109 which extends through them. On the other hand, the lower plate 102 and the upper plate 104 have a raised portion formed in the same manner as described above and the raised portion of the lower plate 102 is turnably connected to the upper plate 104 by means of a pin 110 which extends through both the raised portions. Further, a pair of wheels 111 are rotatably mounted coaxially relative to the lower roller 105 at the position located outwardly of the one end part of the lower plates 101 and 102, whereas a pair of wheels 112 are rotatably mounted coaxially relative to the lower roller 106 at the position located outwardly of the other end part of the lower plates 101 and 102. The wheels 111 and 112 have rimshaped flanges $111_a$ and $112_a$ integrally formed along their inside edge.

Each of the upper and lower rollers 105 and 106 is formed with an annular driving groove 113 and an annular driven groove 114 at the position in proximity of their both end parts. As is apparent from FIG. 15, the driving grooves 113 on the upper rollers 107 and 108 are oppositely disposed from those on the lower rollers 105 and 106, whereas the driven grooves 114 on the upper rollers 107 and 108 are oppositely dislocated from those on the lower rollers 105 and 106 in the same manner as mentioned above. An endless belt 115 is extended between both the lower rollers 105 and 106 around their driven grooves 114 under the influence of tension imparted thereto, whereas an endless belt 116 is extended between both the upper rollers 107 and 108 around their driven grooves 114 uuder the influence of tension imparted thereto. Further, the inner endless conveyance belt 79 passes through the space as defined between the lower roller 105 and the upper roller 107 as well as between the lower roller 106 and the upper roller 108 while it is brought in sliding contact with the driving grooves 113 on the lower rollers 105 and 106. On the other hand, the outer endless conveyance belt 87 passes through the sapce as defined between the lower roller 105 and the upper roller 107 as well as the lower roller 106 and the upper roller 108 while it is brought in sliding contact with the driving grooves 113 on the upper rollers 107 and 108. In the drawings reference numeral 118 designates a deposit box adapted to be contained in the cart 100 in which cash, deposit slip, pass-book or the like are received. As is best seen from FIG. 16, the lower surface of the deposit box 118 comes in contact with both the inner endless conveyance belt 79 and the endless belt 115, whereas the upper surface of the same comes in contact with both the outer endless conveyance belt 87 and the endless belt 116. The deposit box 118 is made of plastic material in accordance with the conventional compression molding process in such a manner that its cover is fitted to the casing in the so-called snap lock fashion. Incidentally, the length of the upper and lower rollers 105, 106, 107 and 108 is determined appreciably larger than the width of the deposit box 118. Further, a distance between both the lower rollers 105 and 106 and a distance between both the upper rollers 107 and 108 are determined appreciably larger than the length of the deposit box 118, whereas a distance between the lower roller 105 and the upper roller 107 and a distance between the lower roller 106 and the upper roller 108 are determined appreciably smaller than the thickness of the deposit box 118. Thus, the deposit box 118 is held within the upper and lower rollers 105, 106, 107 and 108 while it is brought in pressure contact with the endless conveyance belts 79 and 87 and the endless belts 115 and 116.

A distance between the lefthand and righthand wheels 111 and 112 is determined same to that between the rails 55 and 56 and they are designed in the tapered configuration of which diameter decreases in the outward direction. When the cart 100 runs on the arcuate bent portion 57 of rails 55 and 56 at which the latter are forced to twist, there is caused difference in working distance between the lefthand and righthand wheels 111 and 112 and it can be compensated satisfactorily owing to their tapered configuration. Further, the rim-shaped flanges 111$_a$ and 112$_a$ inhibit an occurrence of lateral slippage or displacement of the wheels 111 and 112.

The lower plate 101 has an engagement member 119 turnably supported by means of a pin 119$_a$ or the like means at the position located outwardly of the lower plate 101 in the proximity of the wheel 112, said engagement member 119 having a predetermined weight and being formed with a cutout 120 at its free end. On the other hand, the upper plate 103 has a pin 121 projected thereon to which the engagement member 119 is adapted to come in engagement, said pin 121 being located at the substantially intermediate position between the pin 119$_a$ on the lower plate 101 and the pin 109 at the middle part of the lower plate 101. In the drawings reference numeral 122 designates a pin projected on the outside surface of the upper plate 103, said pin 122 being effective for limiting the extent of turning movement of the engagement member 119. Further, another engagement member 124 is disposed turnably about a pin 124$_a$ on the lower plate 101 in the symmetrical relation relative to the pin 109 at the middle part of the lower plate 101. The engagement member 124 is formed with a cutout 123 at its free end to which an engagement pin 125 is adapted to come in engagement and a pin 126 is projected on the upper plate 103 for limiting outward turning movement of the engagement member 124. To stop movement of the cart the rails 55 and 56 have a stopper 96 respectively at their one end against which the wheels 111 come in abutment and moreover they have a stopper 97 respectively at their other end against which the wheels 112 come in abutment.

Figure 19:
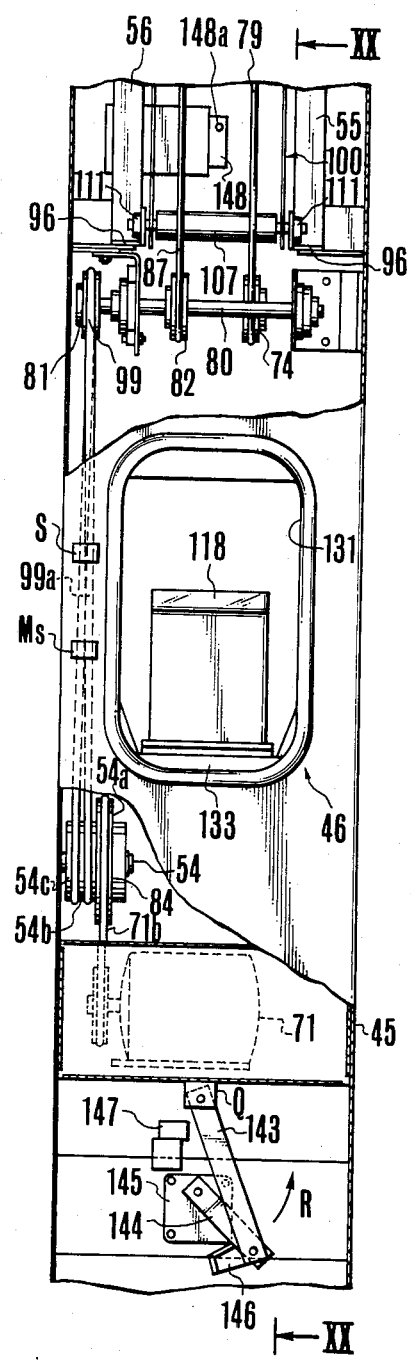
FIG. 19 is a partially sectioned front view of a customer station.
Figure 20:
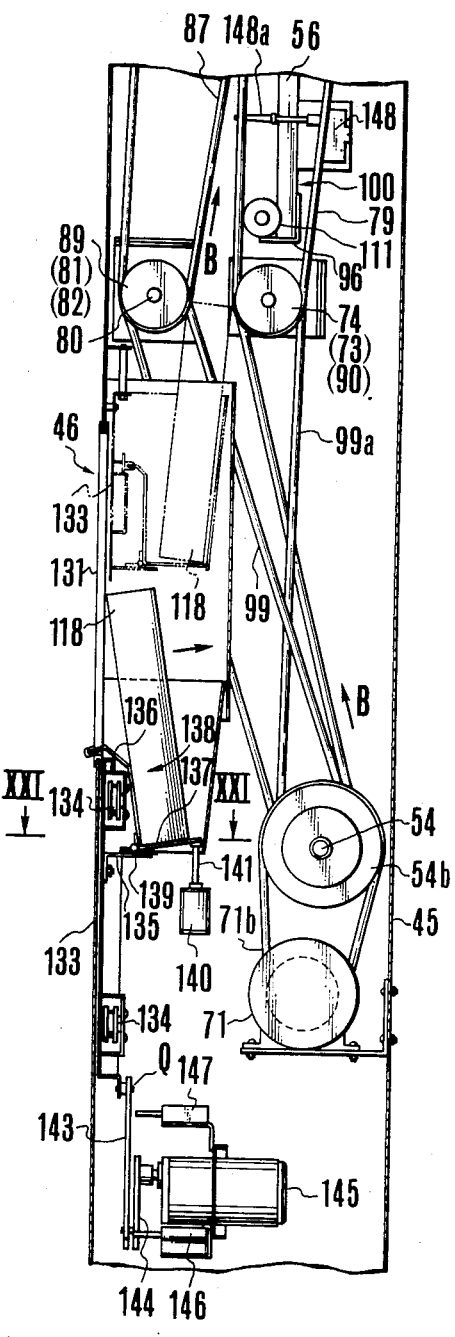
FIG. 20 is a sectional side view of the customer station taken in line XX—XX in FIG. 19.
Figure 21:
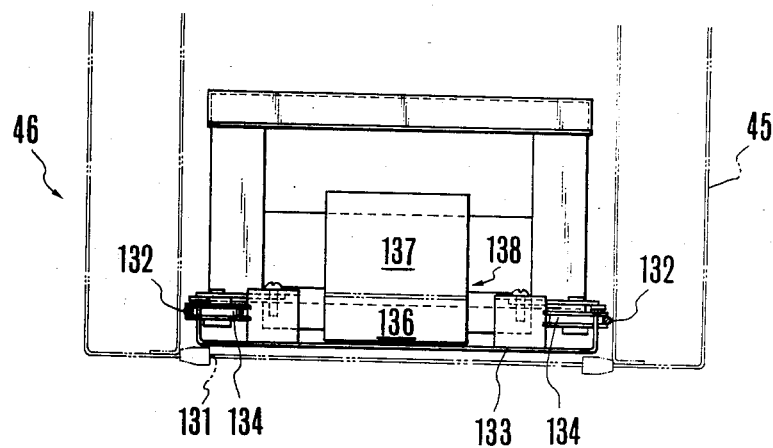
FIG. 21 is a fragmental cross-sectional view of the customer station taken in line XXI—XXI in FIG. 20.

Next, referring to FIGS. 19 to 21, reference numeral 131 designates an opening which is provided on the front surface of the vertical hollow column 45 at the customer station. A pair of guide rods 132 are attached to the vertical column 45 with the aid of brackets or the like means at the position located inwardly of the opening 131 at both the sides of the latter (see FIG. 21). Reference numeral 133 designates a door plate disposed between both the guide rods 132. The door plate 133 has dimensions which are determined appreciably larger than those of the opening 131 and it is equipped with four rollers 134 rotatably supported by means of pins or the like at the four corners. The rollers 134 are brought in rolling contact with the guide rods 132 so that the door plate 133 is displaced upward to close the opening 131 and displaced downward to open the same while it is guided with the aid of the guide rods 132. The door plate 133 has a horizontally extending bracket 135 fixedly secured thereto at its middle part of the rear surface and a L-shaped holder 138 comprising a vertical plate 136 and a bottom plate 137 is turnably supported at the central part of the upper surface of the bracket 135 using hinges. A spring means 139 adapted to normally turn the holder 138 in the clockwise direction is disposed between the bracket 135 and the holder 138.

The bottom plate 137 constituting the holder 138 is projected rearwardly of the bracket 135. A pusher 140 is stationarily disposed at the position located below the bracket 135 and inwardly of the front surface of the vertical hollow column 45. Since an arrangement is made such that when the door plate 133 assumes its lower dead end position, the push rod 141 on the pusher 141 is projected above the horizontal plane of the bracket 135 and thereby the top end part of the push rod 141 abuts against the bottom plate 137 of the holder 138 so as to allow the holder 138 to turn about the hinges in the anticlockwise direction against the resilient force given by the spring means 139. As illustrated by real lines in the drawings, a deposit box 118 to be carried on the cart 100 is first placed on the bottom plate 137 of the holder 138 and it is then inclined outward as the holder 138 is caused to turn. The door plate 133 is pivotally connected to the upper end part of the first connecting rod 143 by means of a pin or the like at the position located at the central part Q of the lower end edge of the door plate 133 and the second connecting rod 144 in turn is pivotally connected to the first connecting rod 143 at its one end part by means of a pin or the like. Further, the other end part of the second connecting rod 144 is fixedly mounted on an output shaft of a small sized motor 145 which is stationarily fitted to the vertical hollow column 45. In the drawings reference numeral 146 designates a microswitch which is disposed at the position where the second connecting rod 144 abuts against said microswitch 146 when the door plate 133 assumes the lower dead end position and reference numeral 147 does another microswitch which is disposed at the position where the first connecting rod 143 abuts against said microswitch 147 when the door plate 133 assumes the upper dead end position. These microswitches 146 and 147 are fixedly secured to the vertical hollow column 45 at the position located inwardly of the latter with the aid of suitable securing means and they are electrically connected to the motor 145 by way of a control circuit which is not shown in the drawings. Reference numeral 148 designates a microswitch which is attached to the one rail 56. The microswitch 148 is electrically connected to the motor 71 and power supply circuit by way of another control circuit which is not shown in the drawings. Further, the microswitch 148 includes a flexible contact piece 148$_a$ which is projected above the rail 56 so that it is turned on or off when the cart 100 reaches the customer station and comes in contact with said flexible contact piece 148$_a$.

Figure 22:
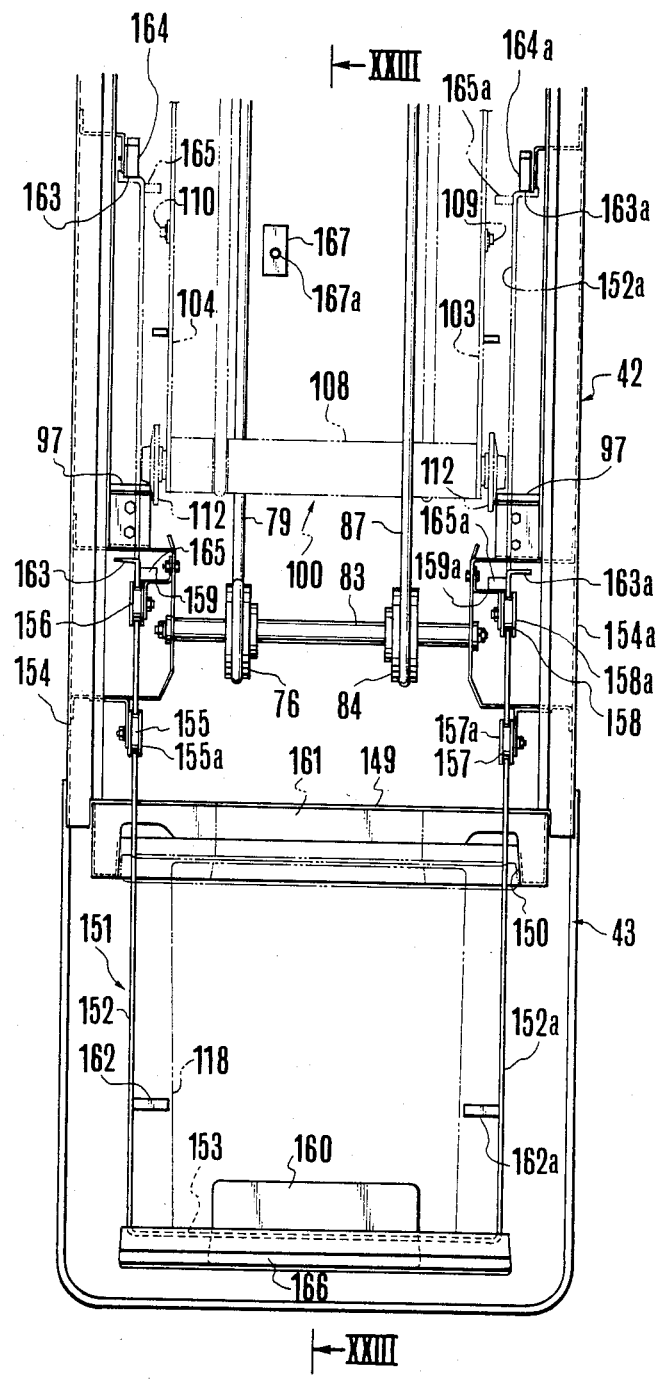
FIG. 22 is a partially sectioned front view of a teller station.

Next, description will be made below as to the delivering and receiving opening 43 at the teller station with reference to FIGS. 14, 22 and 23. The lower end part of the vertical hollow column 42 is covered with a bottom plate 149 which is formed with a rectangular opening 150 at its central part. An upper end part of a deposit box receiver 151 adapted to receive the deposit box 118 therein is inserted through said rectangular opening 150 and the deposit box receiver 151 is constituted by a combination of side plates 152 and 152$_a$ and transverse plate 153 extending therebetween to connect them to one another, said side plates 152 and 152$_a$ extending in parallel to one another. Thus, the deposit box 118 is received in the space as defined by the side plates 152 and 152$_a$ and the traverse plate 153. A distance between both the side plates 152 and 152$_a$ is determined larger than the width of the deposit box 118. It should be noted that the side plates 152 and 152$_a$ are made of magnetizable material such as steel plate or the like.

Four wheel rollers 155, 155$_a$, 156 and 156$_a$ are rotatably mounted with the aid of brackets or the like means at the position located inwardly of the side plate 154 of the vertical hollow column 42. Rotational shafts for the wheel rollers 155 to 156$_a$ extend in parallel to the pulley shafts 75 and 83. As is apparent from FIG. 23, the wheel rollers 155 and 155$_a$ are located below the pulley shafts 75 and 83, whereas the wheel rollers 156 and 156$_a$ are located above the pulley shafts 75 and 83.

Another four wheel rollers 157, 157$_a$, 158 and 158$_a$ are rotatably mounted with the aid of brackets or the like means at the position located inwardly of the side plates 154$_a$. Rotational shafts for the wheel rollers 157 to 158$_a$ extend in parallel to the pulley shafts 75 and 83. The wheel rollers 157 and 157$_a$ are located below the pulley shafts 75 and 83, whereas the wheel rollers 158 and 158$_a$ are located above the pulley shafts 75 and 83. A pair of lower limiting plates 159 and 159$_a$ are bridged between both the upper wheel rollers 156 and 156$_a$ as well as between the upper wheel rollers 158 and 158$_a$. The elongated side plate 152 is extended through the space as defined between both the wheel rollers 155 and 155$_a$ as we between both the wheel rollers 156 and 156$_a$, whereas the elongated side plate 152$_a$ is extended through the space as defined between both the wheel rollers 157 and 157$_a$ as well as between both the wheel rollers 158 and 158$_a$. Thus, the elongated side plates 152 and 152$_a$ are slidable in the vertical direction relative to the side plates 154 and 154$_a$ while they are guided by means of the wheel rollers 155 to 158$_a$.

To prevent an occurrence of disconnection of the deposit box 118 from the transverse plate 153 at its lower end part a preventive plate 160 having a rectangular configuration is fitted to the transverse plate 153 in the vertical posture. Further, to prevent an occurrence of disconnection of the deposit box 118 from the receiver 151 at its upper end part a pillow plate 161 is provided in the form of a projection from the bottom plate 149 of the vertical hollow column 42. An opposing pair of locating rods 162 and 162$_a$ are projected inwardly of the elongated side plates 152 and 152$_a$ so as to assure that the deposit box 118 assumes a correct position in the horizontal direction.

The elongated side plate 152 has an outwardly bent part 163 at its upper end which constitutes an abutment portion and a permanent magnet 164 is fixedly secured to the side plate 163 at the position located above said abutment portion 163 in vertical alignment with the latter. On the other hand, the elongated side plate 152$_a$ has an outwardly bent part 163$_a$ at its upper end which constitute another abutment portion and a permanent magent 164$_a$ is fixedly secured to the side plate 154$_a$ at the position located above said abutment portion 163$_a$ in vertical alignment with the latter. Further, the elongated side plates 152 and 152$_a$ have stoppers 165 and 165$_a$ projected inwardly at their upper end part, said stoppers 165 and 165$_a$ being adapted to abut against the lower limiting plates 159 and 159$_a$. When the deposit box receiver 151 is lifted up by manual operation, the upper end part of the deposit box 118 is brought in such an operative state that it is inserted into the space as defined by the inner endless conveyance belt 79, the driven pulley 76, the auxiliary pulley 94, the outer endless conveyance belt 87, the driven pulley 84 and the auxiliary pulley 95. It should be noted that the permanent magnets 164 and 164$_a$ are located so that the abutment portions 163 and 163$_a$ come in close abutment against the permanent magnets 164 and 164$_a$ under the influence of magnetic attractive force generated by the latter when the above-mentioned operative state has been reached. To assure that any personnel working with the bank handles the deposit box easily by his manual operation at the teller room a grip plate 166 is attached to the bottom of the transverse plate 153. Thus, the abutment portions 163 and 163$_a$ serving as a movable engagement member are engageable to and disengageable from the permanent magnets 164 and 164$_a$ serving as a stationary engagement member in the vertical direction. Alternatively, the permanent magnets 164 and 164$_a$ in the illustrated embodiment may be replaced with electromagnet of which intensity of magnetic force can be adjusted as required.

Figure 23:
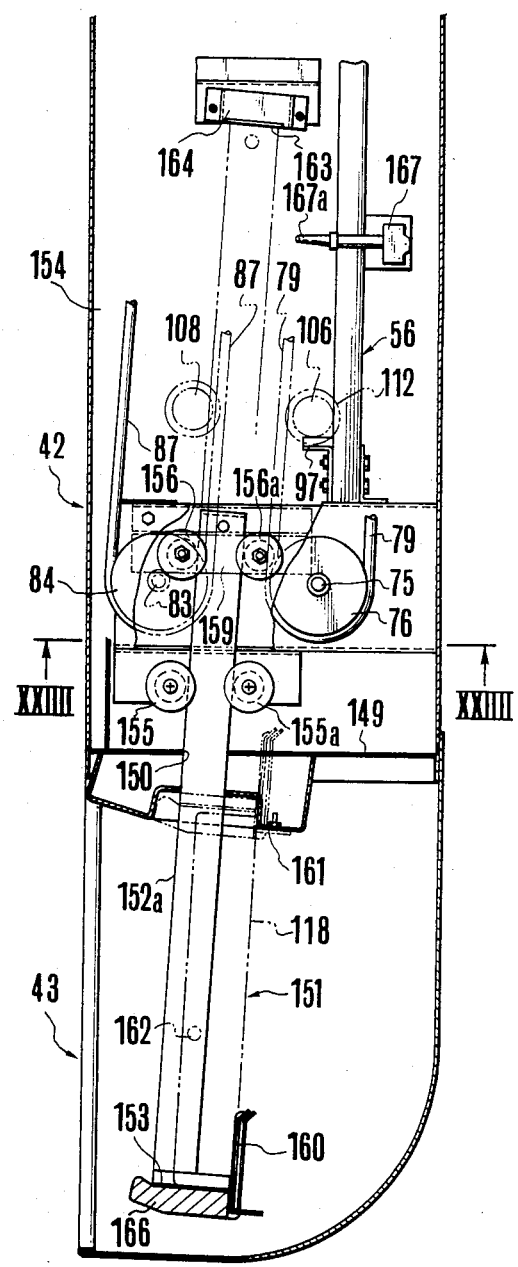
FIG. 23 is a sectional side view of the teller station taken in line XXIII—XXIII in FIG. 22.

In FIG. 23 reference numeral 167 designates a microswitch which is fixedly secured to the rail 56 at the teller station. The microswitch 167 is electrically connected to the motor 71 and power supply circuit via a control circuit which is not shown in the drawings. Further, the microswitch 167 includes a flexible contact piece 167$_a$ projected above the rail 56, said flexible contact piece 167$_a$ being turned on or off when the cart 100 reaches the teller station and comes in contact with it.

Next, operation of the conveyor system as constructed in the above-described manner will be described below.

After a customer reaches one of the car lanes 37 by the side of the island 44 with his car, he informs the teller room by operating the interphone switch MS and the microphone M that he has arrived at the drive-in bank while he stays in his car (see FIG. 3). Next, he takes a deposit box 118 out of the customer station via the delivering and receiving opening 46 by his hand, said deposit box 118 being inclined outwardly, and deposits cash and deposit slip or pass-book therein (see FIGS. 19, 20). After completion of deposition he places the deposit box 118 on the holder 138 and then depresses the send switch S on the vertical hollow column 45 at the customer station so that the driving motor 71 and the door actuating motor 145 initiate their rotation as they are energized by way of the control circuit which is not in the drawings. As the motor 145 is rotated in the normal direction, the second connecting rod 144 is caused to turn in the direction as identified with an arrow mark R whereby the first connecting rod 143 starts its upward movement to displace the door plate 133. As the door plate 133 is displaced upward, the deposit box holder 138 is parted away from the top end of the push rod 141 on the pusher 140 and thereafter it is caused to turn in the clockwise direction as seen in FIG. 20 under the influence of resilient force of the spring 139 until it assumes the substantially vertical posture in the vertical hollow column 45. As illustrated by phantom lines in FIG. 20, the upper end part of the deposit box 118 is inserted into the space as defined by a combination of the driven pulleys 74 and 82 and the auxiliary pulleys 88 and 89, when the door plate 133 is fully closed, that is, it reaches the upper dead end position.

Figure 13:
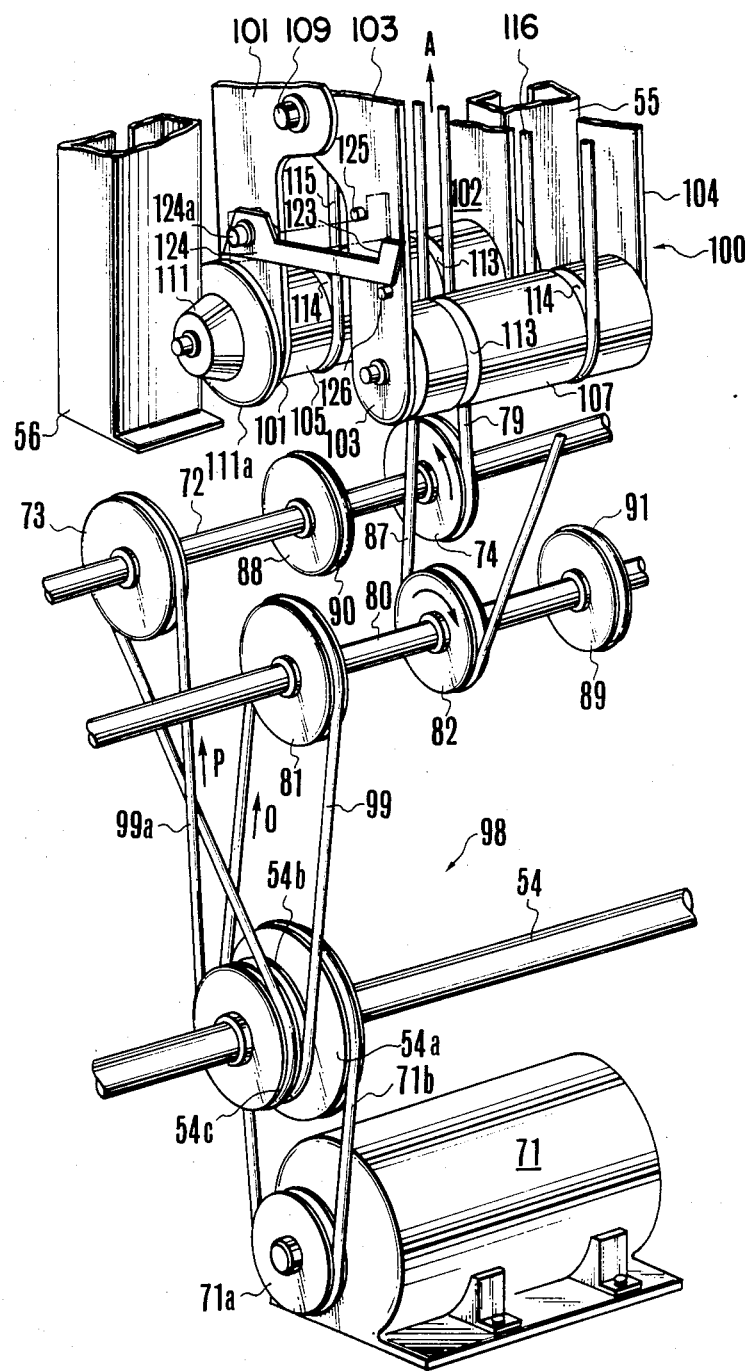
FIG. 13 is a perspective view of a driving mechanism for the conveyor system, shown in an enlarged scale.
Figure 14:
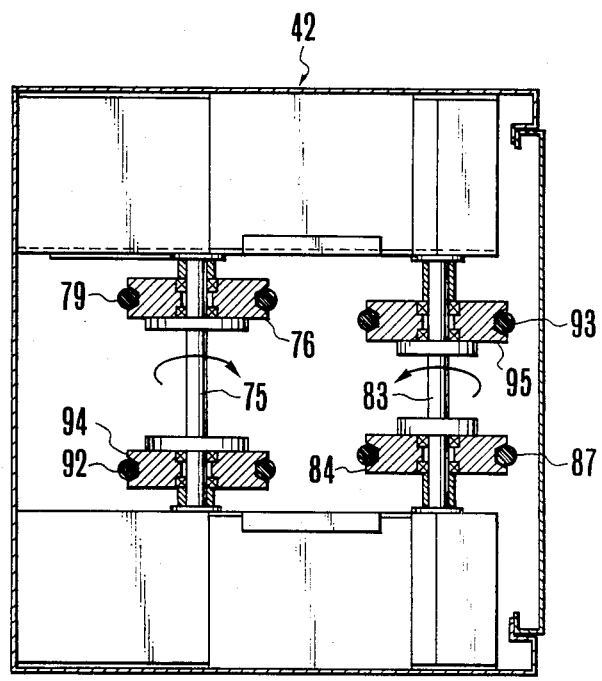
FIG. 14 is a cross-sectional view of the conveyor system taken in line XIIII—XIIII in FIG. 6.
Figure 15:
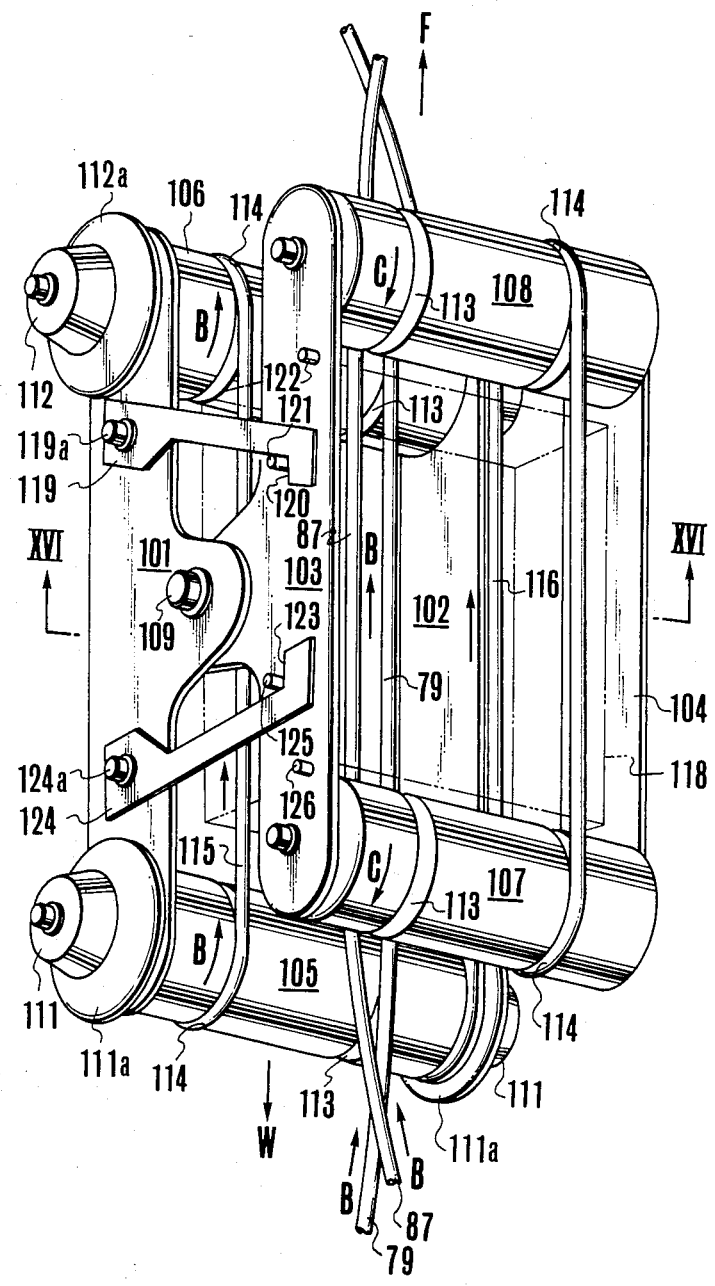
FIG. 15 is a perspective view of a cart, shown in an enlarged scale.
Figure 16:
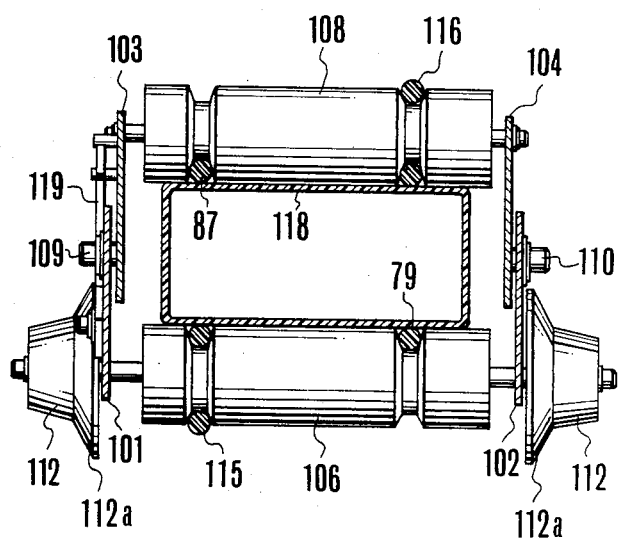
FIG. 16 is a cross-sectional view of the cart taken in line XVI—XVI in FIG. 15.
Figure 17:
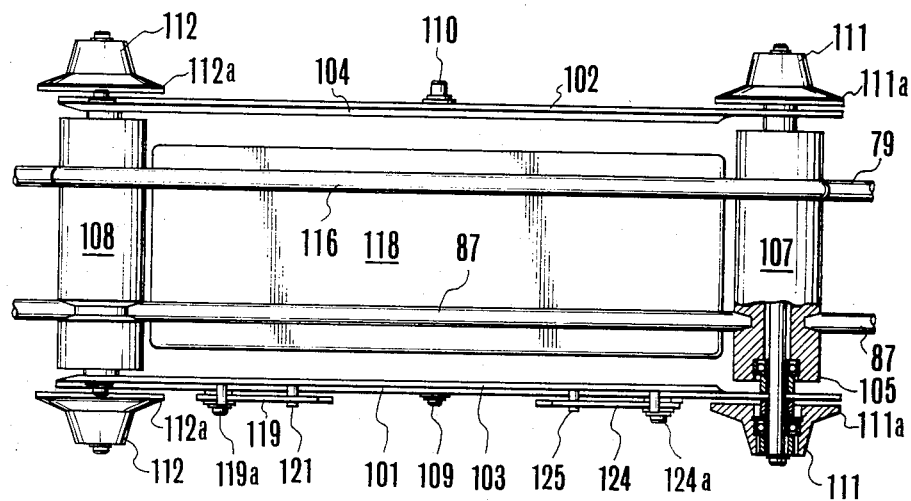
FIG. 17 is a plan view of the cart in FIG. 15.

On the other hand, the motor 71 is rotated in the anticlockwise direction as seen in FIG. 13 (in the direction as identified with an arrow mark in the drawing) so that the larger pulley 54$_a$ is rotated by way of the output pulley 71$_a$ and the endless belt 71$_b$. Thus first rotational speed reduction is carried out in accordance with the reduction ratio which is determined by radius of both the larger pulley 54 and the output pulley 71$_a$ and rotation of the larger pulley 54$_a$ is then transmitted to the speed reduction pulleys 54$_b$ and 54$_c$ by way of the output shaft 54 so that the endless belt 99 is circulated in the direction as identified with an arrow mark 0 and the endless belt 99$_a$ is circulated in the direction as identified with an arrow mark P. Circulation of the endless belt 99$_a$ causes the driven pulley 73 to be rotated and rotation of the latter is transmitted to the driving pulley 74 via the shaft 72 whereby the inner endless conveyance belt 79 is driven by means of the driving pulley 74 in the direction as identified with an arrow mark A in the drawing. On the other hand, circulation of the endless belt 99 causes the driven pulley 81 to be rotated and rotation of the latter is transmitted to the driving pulley 82 via the shaft 80 whereby the outer endless conveyance belt 87 is driven by means of the driving pulley 82 in the same direction A as that of the inner endless conveyance belt 79. At this moment second rotational speed reduction is carried out in accordance with the reduction ratio which is determined by radius of the larger pulley $54_a$ and the speed reduction pulleys $54_b$ and $54_c$. Thus, the deposit box 118 is displaced upwardly while it is resiliently held between a pair of endless conveyance belts 79 and 87 which are circulated in the same direction A in the above-described manner.

At this moment the cart 100 is kept at the waiting position located in the vicinity of the delivering and receiving opening 46 at the customer station (see FIG. 13) where the engagement member 124 disposed at the lower part of the cart as seen in the drawing is caused to turn away from the engagement pin 125 in the clockwise direction due to its own dead weight until it abuts against the turning movement limiting pin 126. The lower plates 101 and 102 are held in the turnable relation relative to the upper plates 103 and 104 by means of the pins 109 and 110 which serve as a center for turning movement. As schematically illustrated in FIG. 25, the upper roller 107 is spaced away from the lower roller 105 by the maximum distance, whereas the upper roller 108 comes close to the lower roller by the minimum distance. While the above-described positional relation is maintained, the deposit box 118 easily enters into the space as defined between the lower roller 105 and the upper roller 107 until its fore end part is brought in resilient contact with the endless conveyance belts 79 and 87 and the endless belts 115 and 116.

Referring to FIG. 15 again, the inner endless conveyance belt 79 rotates the lower rollers 105 and 106 in the direction as identified with an arrow mark B and thereby the endless belt 115 is synchronously driven in the same direction. The outer endless conveyance belt 87 rotates the upper rollers 107 and 108 and drives the endless belt 116 in the direction as indentified with an arrow mark C in the same manner as described above. Thus, the deposit box 118 is brought into the cart 100 while it is resiliently held between a combination of the inner endless conveyance belt 79 and the endless belt 115 and a combination of the outer endless conveyance belt 87 and the endless belt 116. These rollers continue to rotate until the fore end part of the deposit box 118 abuts against the lower roller 106 and the upper roller 108, while the cart 100 is stationarily held on the rails 55 and 56. At this moment a distance between the lower roller 106 and the upper roller 108 is reduced less than the thickness of the deposit box 118 (see FIG. 25). As the deposit box 118 is displaced upwardly and its fore end part thrusts the lower roller 106 and the upper roller 108 away from one another by way of the belts 79, 87, 115 and 116, the upper plates 103 and 104 are caused to turn about the pins 109 and 110 in such a direction that the upper roller 107 approaches to the lower roller 105 and the upper roller 108 is parted away from the lower roller 106 (see FIG. 15). The upper engagement member 119 as seen in the drawing is effective in operatively connecting the lower plate 101 to the upper plate 103, the upper rollers and the lower rollers are spaced way from one another by a constant distance. At this moment the deposit box 118 is encased within the four rollers 105 to 108 and the inner and outer endless conveyance belts 79 and 87 are slightly bent outwardly at the area as defined by the four corners of the deposit box 118 and the rollers 105 to 108 (see FIGS. 18 and 26). This causes frictional force active between a combination of the inner and outer endless conveyance belts 79 and 87 and the endless belts 115 and 116 and the deposit box 118 to be enlarged and therefore the rollers 105 to 108 cannot be rotated any more. However, when driving force F is imparted to both the inner and outer endless conveyance belts 79 and 87 by means of the motor 71 to circulate them in the direction as identified with an arrow mark B, it exceeds the total dead weight W of the cart 100 and the deposit box 118 whereby the cart 100 can be displaced upwardly on the rails 55 and 56 (see FIG. 6). Thus, the deposit box 118 is displaced upwardly through the vertical hollow column 45 while it is carried on the cart 100 with the aid of the inner and outer endless conveyance belts 79 and 87 which serves as resilient holding means. When the cart 100 passes through the arcuate bent portions 57, it is bridged above the idle rollers 60 and 61 with its wheels 111 and 112 being mounted on the rails 55 and 56 and therefore movement of the cart 100 is carried out without any occurrence of interference of the lower rollers 105 and 106 with the idle rollers 60 and 61.

While the cart 100 moves through the vertical hollow column 45 at the customer station or the vertical hollow column 42 at the teller station, the inner and outer endless conveyance belts 79 and 87 come in sliding contact with the idle rollers 60 and 61 which are rotatably mounted on the horizontally extending connecting rod 59 (see FIGS. 6 and 7). When the cart 100 comes closer to the delivering and receiving opening 43 at the teller station, the microswitch 167 is actuated by the fore end part of the cart 100 whereby the motor 71 is turned off. However, due to inertia force of the cart 100 the latter moves downwardly further until it is forced to stop its movement by means of the stopper 97 disposed at the lowermost end part of the rails 55 and 56. At this moment the rollers 106 and 108 assumes the lower position and the rollers 105 and 107 does the upper position as seen in the drawing. On the other hand, the one engagement member 119 is caused to turn downwardly due to its own dead weight until it comes in engagement to the pin 122 at the cutout 120, whereas the other engagement member 124 is also caused to turn away from the pin 126 downwardly due to its own dead weight. Since the deposit box 118 is kept in frictional contact with the inner and outer endless conveyance belts 79 and 87, frictional force active therebetween urges it to be pushed out of the interior of the cart 100 so that the upper roller 108 is thrusted outwardly away from the lower roller 106. Thus, the upper roller 107 comes closer to the lower roller 105 while the upper roller 108 is parted away from the lower roller 106. While the above-mentioned positional relation is maintained, the endless belts 115 and 116 continue to be circulated with the aid of the circulating conveyance belts 79 and 87. Thus, the deposit box 118 is pushed out of the cart 100 under the influence of frictional force of the conveyance belts 79 and 87 and it is then transferred onto the receiver 151 at the teller station while the driven rollers 76 and 84 and the auxiliary pulleys 94 and 95 are rotated.

At this moment the deposit box receiver 151 is located at the upper dead end position and the abutment portions 163 and 163$_a$ are detachably attached to the corresponding permanent magnets 164 and 164$_a$ under the influence of magnetic force of the latter. After the deposit box 118 is pushed out of the cart 100, it falls down and collides against the transverse plate 153 at its fore end part. Impulsive force generated at the time of collision exceeds magnetic attractive force of the permanent magnets 164 and 164$_a$ by means of which the abutment portions 163 and 163$_a$ are detachably attached to the latter. Thus, the abutment portions 163 and 163$_a$ are disconnected from the permanent magnets 164 and 164$_a$ and the elongated side plates 152 and 152$_a$ constituting the deposit box receiver 151 are displaced downwardly while they are guided by means of the wheel rollers 155 to 158$_a$, until the receiver 151 is lowered to the delivering and receiving opening 43 after it passes through the opening 150 on the bottom plate 149. Thereafter, the stoppers 165 and 165$_a$ projected inwardly of the elongated side plates 152 and 152$_a$ come in abutment against the lower limit defining plates 159 and 159$_a$ and therefore the receiver 151 cannot be displaced downwardly any more. Now, the deposit box 118 is ready to be removed from the receiver 151 by any personnel in the bank.

Figure 24:
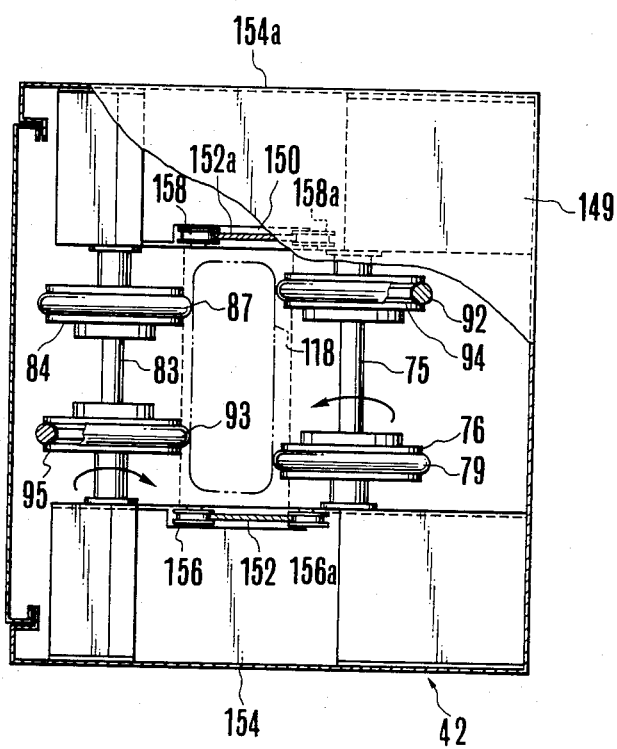
FIG. 24 is a cross-sectional view of the teller station taken in line XXIIII—XXIIII In FIG. 23.

Next, when cash, pass-book or the like is to be transferred to the customer station from the teller station, a personnel in the bank depresses the send switch which is not shown in the drawing so that the driving mechanism 98 initiates its operation. As the motor 71 rotates, its rotational force is transmitted to the inner and outer endless conveyance belts 79 and 87 and the driven pulley 76, the auxiliary pulley 94, the driven pulley 84 and the auxiliary pulley 95 are rotated in the direction as identified with an arrow mark in FIGS. 14 and 24. Next, a personnel in the bank puts the deposit box 118 on the receiver 151 in such a manner that the lower end part of the deposit box 118 contacts the transverse plate 153 and the preventive plate 160 and the upper end part of the same does the pillow plate 161, and thereafter the deposit box 118 is displaced upwardly while he graspes the grip plate 166. The elongated side plates 152 and 152$_a$ are also displaced upwardly while they are guided by means of the wheel rollers 155 to 158$_a$ and the fore end part of the deposit box 118 is then inserted into the space as defined by the driven pulley 76, the auxiliary pulley 94, the driven pulley 84 and the auxiliary pulley 95 while the deposit box 118 is kept in contact with the pillow plate 161. As the upper end part of the deposit box 118 is introduced into the space as defined by these pulleys 76, 94, 84 and 95 with the aid of rotational force generated by the latter, it is contained in the cart 100 in the same manner as described above. At the same time both the abutment portions 163 and 163$_a$ are brought in firm engagement to the permanent magnets 164 and 164$_a$ with the aid of magnetic force generated by the latter (as illustrated by phantom lines in FIG. 22).

Figure 18:
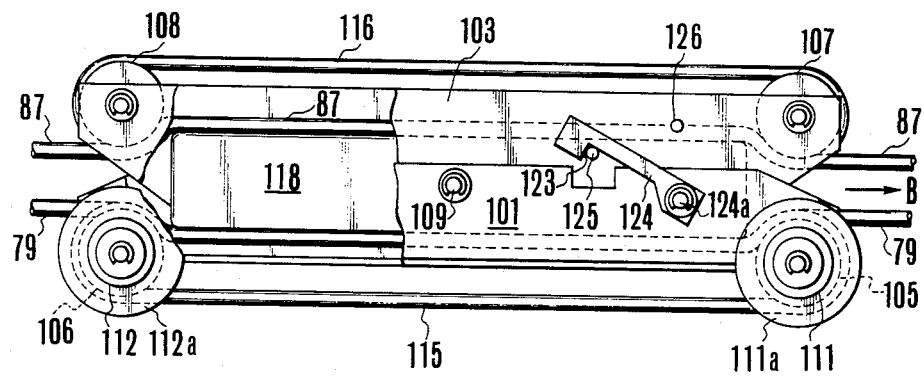
FIG. 18 is a side view of the cart in FIG. 15.

As illustrated in FIG. 18, the deposit box 118 is resiliently held in the space as defined by the inner and outer endless conveyance belts 79 and 87 and the endless belts 115 and 116, wherein these endless belts are slightly bent inwardly at the position located in the vicinity of the upper and lower rollers 105 to 108. As the motor 71 continues to rotate, the cart 100 moves on the rails 55 and 56 together with the deposit box 118 carried thereon with the aid of the inner and outer endless conveyance belts 79 and 87 which have been circulated by means of the motor 71. When the fore end part of the cart 100 reaches the microswitch 148 disposed on the vertical hollow column 45 at the customer station, the motor 71 stops its rotation but the inner and outer endless conveyance belts 79 and 87 continue to be circulated due to inertia force of the conveyor system.

The cart 100 is then caused to forcible stop against the stopper 96 at the customer station and the deposit box 118 is pushed out of the space as defined between the lower roller 105 and the upper roller 107 under the influence of frictional force developed by the inner and outer endless conveyance belts 79 and 87 so that it is removed from the cart 100 and it is then placed on the holder 138. At the same time the motor 145 is energized by way of a control circuit which is not shown in the drawings so as to rotate in the reverse direction whereby the door plate 133 is displaced downwardly by means of the first and second connecting rods 143 and 144 until the opening 131 is fully opened. As the door plate 133 is displaced downwardly further, the bottom plate 137 comes in contact with the top end of the push rod 141 on the pusher 140 so that the holder 138 with the deposit box 118 carried thereon is caused to turn outwardly. When the door plate 133 is lowered to the lower dead end position, the second connecting rod 144 actuates the microswitch 146 and thereby the motor 145 stops its rotation. Since the deposit box 118 is inclined toward the opening 131, it is ready to be easily taken out by any customer.

During conveyance of the deposit box the wheels 111 and 112 roll on the rails 55 and 56. Owing to the arrangement that they are designed in the tapered cross-sectional configuration respectively any difference in working distance between both the inner and outer wheels can be readily compensated by means of the aforesaid tapered portions when they pass through the arcuate bent portions 57 where both the rails 55 and 56 are caused to twist. Thus, the cart 100 can move on the rails 55 and 56 smoothly at a high speed. When the cart 100 tends to be displaced in the transverse direction for some reason, the flanges 111$_a$ and 112$_a$ integrally secured to the wheels 111 and 112 are brought in contact with the side walls 63 and 64 of the rails 55 and 56 and therefore there is no fear that the cart 100 runs over the rails 55 and 56 in the transverse direction.

As will be readily understood from the above description, the conveyor system of the invention is constructed such that two lines of rails are extended through the whole hollow framework with two arcuate bent portions disposed midway of the latter at which the rails are caused to twist, the length of the rails being determined to any required one by way of adding or cutting, so that a cart with a deposit box carried thereon moves on the rails between the customer station and the teller station while it is driven by means of inner and outer endless conveyance belts, said deposit box containing cash, deposit slip, pass-book or the like therein. Accordingly, the conveyor system can be installed and operated at an inexpensive cost. Further, since there is no necessity for mounting a number of idle rollers over the whole length of the passage of the cart, the latter can move through the conveyor system at a high speed. Further, since the length of each of the horizontally extending hollow beams is determined to a required one by cutting operation at the installation site in dependence on the position where the vertical hollow column at the custom station is located, the conveyor system does not have such hitherto experienced inconvenience that all the horizontally extending hollow beams are prefabricated in a manufacturing plant in accordance with their specified length and therefore the conveyor system can be easily assembled at an inexpensive cost. Further, since the rails are twisted to a required angle at the arcuate bent portions at the installation site, the conveyor system does not have such hitherto experienced inconvenience that each of rails is previously twisted to their specified twisting angle at a manufacturing plant using a specific guide member prepared particularly therefore. Further, since each of the horizontally extending hollow beams can be firmly mounted on the top end of the vertical hollow columns at both the customer and teller stations in such a manner that the former is turned in the horizontal direction with respect to the latter as seen from the above, a number of islands can be provided for customers without any fear that they are not visually recognized from the teller room. Personnels in a drive-in bank work in a small centralized teller room, resulting in improved working efficiency being assured. Since the conveyor system is simple in structure, it can be installed by a small number of workers by way of the steps of cutting, adding, bending or twisting standard components at the installation site which have been shipped from a manufacturing plant.

Since the conveyor system of the invention essentially comprises guide members extending through the hollow framework with arcuate bent portions disposed midway of the passage of the latter, inner and outer endless conveyance belts adapted to resiliently hold a deposit box therebetween, said inner and outer endless conveyance belts extending along the guide members, a cart having the deposit box removably contained therein, said cart being movable on the guide members in both directions while it being brought in contact with the inner and outer endless conveyance belts, and stopper members disposed at both the end parts of the guide members, only a single motor is required for operating the conveyor system with the aid of a small number of idle rollers mounted thereon and therefore installation and operation of the conveyor system can be carried out at an inexpensive cost. Further, since the whole conveyor system is simple in structure, there occurs very few malfunction such as stoppage, intermittence of operation or the like and therefore banking businesses are transacted smoothly without any reduction of satisfactory service for customers.

In a preferred embodiment of the invention the conveyor system includes a delivering and receiving opening on the vertical hollow column at the customer station, a door slidably fitted to said delivering and receiving opening to slide along the latter, a deposit box holder adapted to hold a deposit box thereon, said holder being turnably fitted to said door, a link mechanism for displacing the door upwardly and downwardly, a motor for actuating said link mechanism and a pushing member adapted to abut against the bottom of the holder to turn the latter. Accordingly, it is assured that a deposit box is transferred to the teller room without any psychological burden imparted to customer. Since the deposit box is caused to turn toward the delivering and receiving opening, it can be safely taken out of the holder by him while he stays in his car.

While the present invention has been described above with respect to a preferred embodiment, it should of cource be understood that it should not be limited only to this but various changes or modifications may be made in a suitable manner without departure from the spirit and scope of the invention as defined by appended claims.

What is claimed is:

1. In a conveyor system for a drive-in bank of the type including first delivering and receiving stations, a plurality of first vertical hollow columns standing upright on said first delivering and receiving stations, second delivering and receiving stations, a plurality of second vertical hollow columns standing upright on said second delivering and receiving stations, a plurality of horizontally extending hollow beams to connect both the first and second vertical hollow columns to one another at their top ends, conveyance means for conveying a deposit box in both directions through the first vertical hollow column, the horizontally extending hollow beam and the second vertical hollow column and vise versa and driving means for driving said conveyance means in the specified direction, the improvement consisting in that the conveyance means essentially comprises guide members having arcuate bent portions at junctions between the first vertical hollow column and the horizontally extending hollow beam as well as between the second vertical hollow column and the horizontally extending hollow beam, an opposing pair of endless conveyance belts extending along said guide members to resiliently contact and hold a deposit box in the space as defined by said endless conveyance belts, a cart removably containing the deposit box therein which cart is in resilient contact with the endless conveyance belts, said cart being movable on the guide members in both directions by said endless conveyance belts and stopper means disposed at both the end parts of the guide members so as to inhibit further movement of the cart.

2. A conveyor system for a drive-in bank as defined in claim 1, wherein an end part of the horizontally extending hollow beam is formed with an arcuate groove and a top end part of one vertical hollow column includes an engagement means adapted to be fitted through said arcuate groove and vise versa, while the other end part of the horizontally extending hollow beam is formed with an arcuate groove and the top end part of the other vertical hollow column includes an engagement means adapted to be fitted through said arcuate groove and vise versa, so that the horizontally extending hollow beam is fixedly mounted on the top end parts of both vertical hollow columns in the turned state relative to the latter as seen from the above.

3. A conveyor system for a drive-in bank as defined in claim 1, wherein the driving means essentially comprises a motor fixedly mounted on one vertical hollow column, a speed reduction mechanism operatively connected to said motor, said speed reduction mechanism including an output shaft, two pulleys fixedly mounted on the output shaft, a pair of shafts rotatably supported on the vertical hollow column in a spaced relation, a first driven pulley fixedly mounted on one shaft of said pair of shafts with a first endless belt extended between one of said two pulleys and said driven pulley in a parallel relation, a driving pulley fixedly mounted on the aforesaid one shaft around which one of the endless conveyance belts is extended, a second driven pulley fixedly mounted on the other shaft of said pair of shafts with an endless belt extended between the other pulley of said two pulleys and the second driven pulley in a cross-shaped relation, and another driving pulley fixedly mounted on the aforesaid other shaft around which the other endless conveyance belt is extended.

4. A conveyor system for a drive-in bank as defined in claim 1, wherein the first delivering and receiving station includes an opening formed on the vertical hollow column, a slidable door fitted to said opening to slide along the latter, a holder adapted to hold a deposit box, said holder being turnably fitted to said door, a link mechanism disposed in the vertical hollow column to displace the door upwardly and downwardly, a motor for driving said link mechanism and a pusher adapted to abut against the bottom of the holder so as to turn the holder.

5. A conveyor system for a drive-in bank as defined in claim 4, wherein a spring means is disposed between the holder and the door so as to allow the holder to turn inwardly relative to the vertical hollow column.

6. A conveyor system for a drive-in bank as defined in claim 1, wherein the second delivering and receiving station includes engagement members disposed inwardly of the second vertical hollow column, a receiver adapted to receive a deposit box thereon, said receiver being slidable through the lower part of the second vertical hollow column, and abutment members fixedly secured to the top of the receiver, said abutment members being adapted to come in engagement to or out of engagement from the engagement members.

7. A conveyor system for a drive-in bank as defined in claim 6, wherein the engagement members comprises a permanent magnet respectively and the abutment members are made of magnetizable material.

8. A conveyor system for a drive-in bank as defined in claim 1, wherein the cart comprises two pairs of upper and lower plates turnably connected to one another at a middle part thereof, two upper rollers rotatably supported on the upper plates at both the ends of the latter, said upper rollers serving to connect the opposing pair of upper plates to one another, two lower rollers rotatably supported on the lower plates at both the ends of the latter, said lower rollers serving to connect the opposing pair of lower plates to one another, and four wheels rotatably supported on the lower rollers at the position located outwardly of the lower plates, said wheels being adapted to roll on the guide members.

9. A conveyor system for a drive-in bank as defined in claim 8, wherein one endless belt of said pair of endless belts is extended around the opposing pair of upper rollers and the other endless belt of said pair of endless belts is extended around the opposing pair of lower rollers.

10. A conveyor system for a drive-in bank as defined in claim 8, wherein the cart includes an opposing pair of engagement members of which one end part is pivotally supported on the lower plate and of which other end part is adapted to come in engagement to and out of engagement from a pin projected on the upper plate.

11. A conveyor system for a drive-in bank as defined in claim 1, wherein the guide members comprise two lines of rails extending in parallel to one another, said rails include an arcuate bent portion at a junction between one vertical hollow column and the horizontally extending hollow beam as well as between the other vertical hollow column and the horizontally extending hollow beam.

12. A conveyor system for a drive-in bank as defined in claim 11, wherein each of said rails is designed in the form of a hollow tubular member with a longitudinally extending cutout formed thereon, said tubular member being fixedly held within the vertical hollow columns and horizontal hollow beam on a support portion by means of tightening members.

13. A conveyor system for a drive-in bank as defined in claim 12, wherein the tubular member is designed in the form of a hollow rectangular member comprising an opposing pair of side walls, an upper face and an opposing pair of lower faces with said longitudinally extending cutout formed therebetween, said hollow rectangular member being firmly held on the support portion with the aid of plate-shaped tightening members.

* * * * *